US012008288B2

(12) United States Patent
Haneda et al.

(10) Patent No.: US 12,008,288 B2
(45) Date of Patent: Jun. 11, 2024

(54) AUDIO SIGNAL PROCESSING DEVICE BASED ON ORIENTATION

(71) Applicant: SONY SEMICONDUCTOR SOLUTIONS CORPORATION, Kanagawa (JP)

(72) Inventors: Naoya Haneda, Kanagawa (JP); Mikita Yasuda, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 224 days.

(21) Appl. No.: 17/431,690

(22) PCT Filed: Nov. 19, 2019

(86) PCT No.: PCT/JP2019/045255
§ 371 (c)(1),
(2) Date: Aug. 17, 2021

(87) PCT Pub. No.: WO2020/174776
PCT Pub. Date: Sep. 3, 2020

(65) Prior Publication Data
US 2022/0137919 A1 May 5, 2022

(30) Foreign Application Priority Data
Feb. 25, 2019 (JP) ................................ 2019-031535

(51) Int. Cl.
*G06F 3/16* (2006.01)
*H04S 7/00* (2006.01)
(52) U.S. Cl.
CPC .............. *G06F 3/165* (2013.01); *H04S 7/302* (2013.01); *H04S 7/307* (2013.01)

(58) Field of Classification Search
CPC ......... G06F 3/162; G06F 3/165; G06F 16/683
(Continued)

(56) References Cited

U.S. PATENT DOCUMENTS

2016/0219392 A1* 7/2016 Vilermo ................. G06F 3/165
2019/0289420 A1* 9/2019 Makinen ................. H04S 7/304
(Continued)

FOREIGN PATENT DOCUMENTS

JP 2012-230135 A 11/2012
JP 2017-092818 A 5/2017
(Continued)

OTHER PUBLICATIONS

International Search Report and Written Opinion of PCT Application No. PCT/JP2019/045255, dated Dec. 24, 2019, 06 pages of ISRWO.

*Primary Examiner* — Alexander Krzystan
(74) *Attorney, Agent, or Firm* — CHIP LAW GROUP

(57) ABSTRACT

An adjustment of an audio signal based on an orientation variation amount is carried out according to a surrounding audio condition. An audio signal processing device includes an audio signal analysis unit, an orientation variation analysis unit, and an audio signal adjustment unit. The audio signal analysis unit acquires an audio signal and sets a target value for an audio adjustment on the basis of the audio signal. The orientation variation analysis unit acquires orientation information and generates an orientation variation amount on the basis of the orientation information. The audio signal adjustment unit adjusts the audio signal toward the target value according to the orientation variation amount.

9 Claims, 25 Drawing Sheets

(58) Field of Classification Search
USPC .......................................................... 700/94
See application file for complete search history.

(56) References Cited

U.S. PATENT DOCUMENTS

| | | | |
|---|---|---|---|
| 2020/0278828 A1* | 9/2020 | Murtaza | G02B 27/0179 |
| 2021/0382678 A1* | 12/2021 | Back | H04M 3/568 |
| 2021/0409888 A1* | 12/2021 | Schevciw | H04R 3/00 |
| 2022/0137919 A1* | 5/2022 | Haneda | H04S 7/302 |
| | | | 700/94 |

FOREIGN PATENT DOCUMENTS

| JP | 2017-199995 A | 11/2017 |
|---|---|---|
| JP | 2018-148254 A | 9/2018 |

\* cited by examiner

AUDIO SIGNAL PROCESSING DEVICE BASED ON ORIENTATION

CROSS REFERENCE TO RELATED APPLICATIONS

This application is a U.S. National Phase of International Patent Application No. PCT/JP2019/045255 filed on Nov. 19, 2019, which claims priority benefit of Japanese Patent Application No. JP 2019-031535 filed in the Japan Patent Office on Feb. 25, 2019. Each of the above-referenced applications is hereby incorporated herein by reference in its entirety.

TECHNICAL FIELD

The present technology relates to audio signal processing devices. More specifically, the present technology relates to an audio signal processing device that adjusts an audio signal on the basis of an orientation variation amount.

BACKGROUND ART

In an imaging device, known is a technique of detecting a movement using a gyro sensor or the like and carrying out a hand shake correction by cutting out an image from a frame memory according to the movement that has been detected (for example, see Patent Document 1). Further, in a game system or the like for simulating a musical instrument, a technique of controlling an audio according to an orientation change amount that has been acquired is proposed (for example, see Patent Document 2).

CITATION LIST

Patent Document

Patent Document 1: Japanese Patent Application Laid-Open No. 2017-199995
Patent Document 2: Japanese Patent Application Laid-Open No. 2012-230135

SUMMARY OF THE INVENTION

Problems to be Solved by the Invention

In the above-described conventional technique of controlling the audio according to an orientation change amount, simulation of a musical instrument is assumed, and the orientation change amount is focused on as information for playing the musical instrument. In a case where such a technique is applied to an imaging device and an attempt is made to correct the audio according to the hand shake correction of the image, if the audio is changed by using only the orientation change amount regardless of the surrounding audio situation, the audio will mismatch the surrounding audio situation. There is a possibility of giving a viewer/listener a sense of incongruity.

The present technology has been made in view of the above circumstances, and has an object of adjusting an audio signal based on an orientation variation amount according to a surrounding audio situation.

Solutions to Problems

The present technology has been made to solve the above-described problems, and a first aspect thereof is an audio signal processing device including: an audio signal analysis unit configured to acquire an audio signal, and configured to set a target value for an audio adjustment on the basis of the audio signal; an orientation variation analysis unit configured to acquire orientation information, and configured to generate an orientation variation amount on the basis of the orientation information; and an audio signal adjustment unit configured to adjust the audio signal toward the target value according to the orientation variation amount. This configuration brings about an effect of adjusting the audio signal toward the target value according to the orientation variation amount.

Further, in the first aspect, the audio signal adjustment unit may adjust the audio signal to lower a volume of the audio signal when the orientation variation amount becomes larger than a first threshold value, and after the audio signal reaches the target value, when the orientation variation amount becomes smaller than a second threshold value, the audio signal adjustment unit may adjust the audio signal to return the volume of the audio signal. This configuration brings about an effect of controlling an increase and a decrease in audio volume according to the orientation variation amount.

Further, in the first aspect, the audio signal adjustment unit may adjust the audio signal to narrow a frequency bandwidth of the audio signal when the orientation variation amount becomes larger than a first threshold value, and after the audio signal reaches the target value, when the orientation variation amount becomes smaller than a second threshold value, the audio signal adjustment unit may adjust the audio signal to return the frequency bandwidth of the audio signal. This configuration brings about an effect of controlling the frequency bandwidth according to the orientation variation amount.

Further, in the first aspect, the audio signal adjustment unit may adjust the audio signal to lower a gain of a frequency of the audio signal when the orientation variation amount becomes larger than a first threshold value, and after the audio signal reaches the target value, when the orientation variation amount becomes smaller than a second threshold value, the audio signal adjustment unit may adjust the audio signal to return the gain of the frequency of the audio signal. This configuration brings about an effect of controlling the frequency gain according to the orientation variation amount.

Further, in the first aspect, the audio signal adjustment unit may adjust the audio signal, in a case where one of states continues for a predetermined period of time, the states including a state in which the orientation variation amount is larger than a first threshold value, and a state in which the orientation variation amount is smaller than a second threshold value. This configuration brings about an effect of suppressing an unnatural behavior by giving a hysteresis characteristic in the adjustment of the audio signal.

Further, in the first aspect, the audio signal adjustment unit may adjust the audio signal in a stepwise manner with a step size of a fixed amount. This configuration brings about an effect of suppressing a sense of incongruity in the audio reproduction.

Further, in the first aspect, a sensor configured to detect either an acceleration or an angular velocity, and configured to generate the orientation information may be further included. This configuration brings about an effect of adjusting the audio signal on the basis of the orientation information that has been detected within the device.

Further, in the first aspect, a recording and reproducing unit configured to record and reproduce the audio signal and the orientation information in synchronization may be further included, in which the audio signal analysis unit may set the target value on the basis of the audio signal that has been reproduced, the orientation variation analysis unit may generate an orientation variation amount on the basis of the orientation information that has been reproduced, and the audio signal adjustment unit may adjust the audio signal that has been reproduced according to the orientation variation amount that has been reproduced. This configuration brings about an effect of adjusting the audio signal at the time of reproduction on the basis of the audio signal and that orientation information that have been once recorded.

Further, in the first aspect, an image signal correction unit configured to acquire an image signal that is in synchronization with the audio signal, and configured to correct a blur of the image signal according to the orientation variation amount may be further included. This configuration brings about an effect of adjusting the audio signal and correcting a blur of the image signal.

Further, in the first aspect, the audio signal adjustment unit may adjust the audio signal in a case where there is a correlation between an orientation variation indicated by the orientation variation amount and a variation in the audio signal. This configuration brings about an effect of suppressing the adjustment of the audio signal, in a case where there is no audio variation although there is an orientation variation.

MODE FOR CARRYING OUT THE INVENTION

Hereinafter, embodiments for carrying out the present technology (hereinafter, referred to as embodiments) will be described. The description will be given in the following order.

1. First embodiment (an example of adjusting an audio signal level according to an orientation variation amount)
2. Second embodiment (an example of adjusting a frequency spectrum of the audio signal according to the orientation variation amount)
3. Third embodiment (an example of adjusting, at the time of reproduction, an audio signal that has been recorded)
4. Fourth embodiment (an example of a hand shake correction in an image)
5. Fifth embodiment (an example of adjusting an audio signal in a case where there is a correlation with an orientation variation)

1. First Embodiment

[Configuration of Audio Signal Processing Device]

Figure 1:
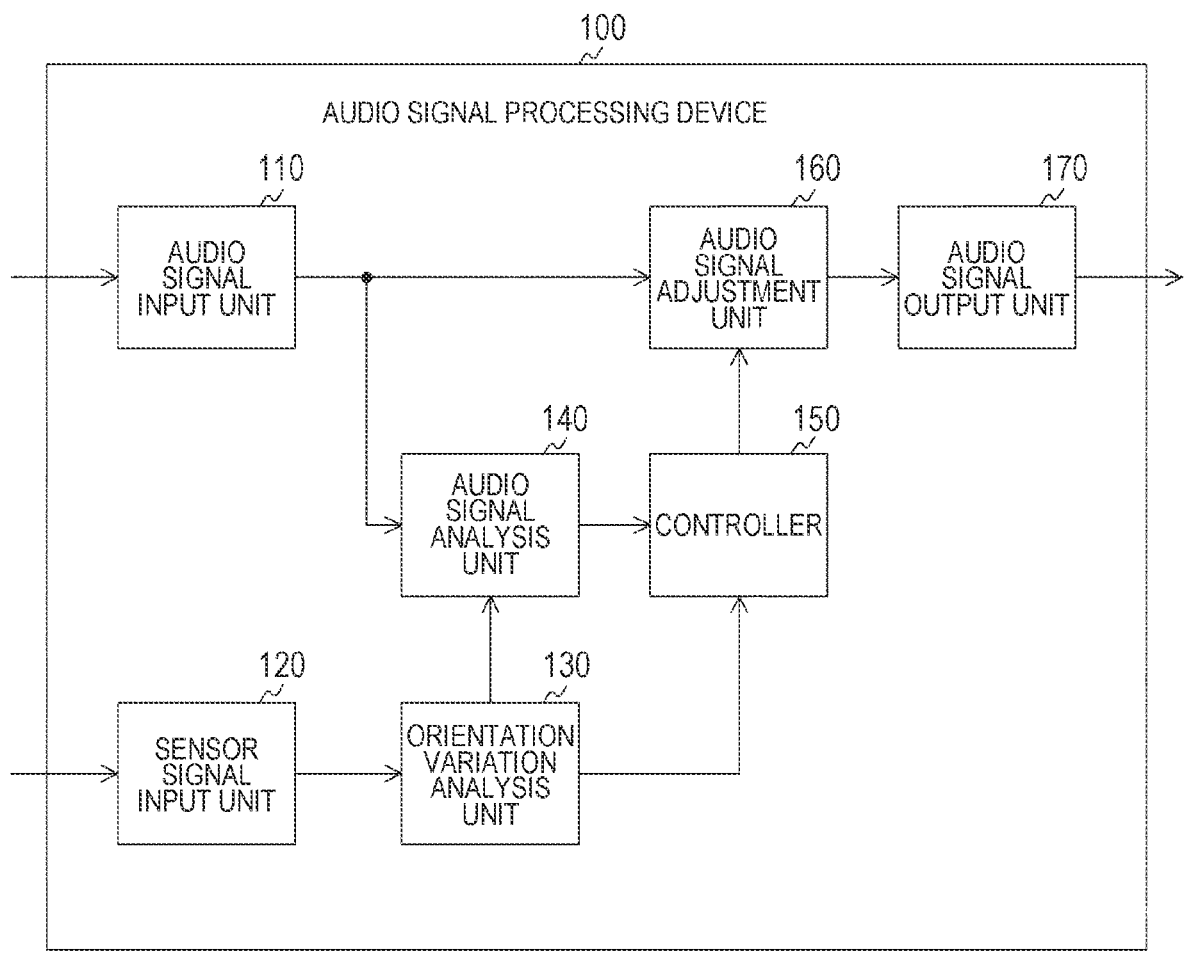
FIG. 1 is a diagram showing a configuration example of an audio signal processing device 100 in a first embodiment of the present technology.

FIG. 1 is a diagram showing a configuration example of an audio signal processing device 100 in a first embodiment of the present technology.

The audio signal processing device 100 includes an audio signal input unit 110, a sensor signal input unit 120, an orientation variation analysis unit 130, an audio signal analysis unit 140, a controller 150, an audio signal adjustment unit 160, and an audio signal output unit 170.

The audio signal input unit 110 receives an audio signal to be input into the audio signal processing device 100. The audio signal input unit 110 may be a device such as a microphone, for example. The audio signal input unit 110 converts the audio signal that has been input from an analog signal to a digital signal (A/D conversion), and supplies the audio signal analysis unit 140 and the audio signal adjustment unit 160 with data of the digital signal.

The sensor signal input unit 120 receives orientation information such as an acceleration or an angular velocity applied to the audio signal processing device 100. The sensor signal input unit 120 may be, for example, an acceleration sensor such as a gyro sensor or an angular velocity sensor. In this case, the sensor signal input unit 120 is an example of a sensor described within the scope of claims. The sensor signal input unit 120 carries out an A/D conversion of converting the orientation information that has been input, and supplies the orientation variation analysis unit 130 with the data of the digital signal.

The orientation variation analysis unit 130 analyzes a variation in orientation of the audio signal processing device 100 on the basis of the orientation information that has been supplied from the sensor signal input unit 120. The orientation variation analysis unit 130 generates an orientation variation amount as a result of the analysis, and supplies the controller 150 with the orientation variation amount.

The audio signal analysis unit 140 analyzes the audio signal that has been supplied from the audio signal input unit 110, and sets a target value for an audio adjustment on the basis of the audio signal. The audio signal analysis unit 140 measures an audio signal level, and supplies the controller 150 with a maximum signal level as a target value.

The controller 150 controls an audio signal adjustment in the audio signal adjustment unit 160. The controller 150 supplies the audio signal adjustment unit 160 with a gain as an adjustment parameter of the audio signal according to the orientation variation amount that has been supplied from the orientation variation analysis unit 130 and the target value that has been supplied from the audio signal analysis unit 140.

The audio signal adjustment unit 160 adjusts the audio signal according to the gain by multiplying the audio signal that has been supplied from the audio signal input unit 110 by the gain that has been supplied from the controller 150. The audio signal adjustment unit 160 supplies the audio signal output unit 170 with the audio signal that has been adjusted.

The audio signal output unit 170 converts the audio signal that has been adjusted and that has been supplied from the audio signal adjustment unit 160 from a digital signal to an analog signal (D/A conversion), and outputs an audio signal of the analog signal.

[Signal Waveforms and Sections]

Figure 2A:
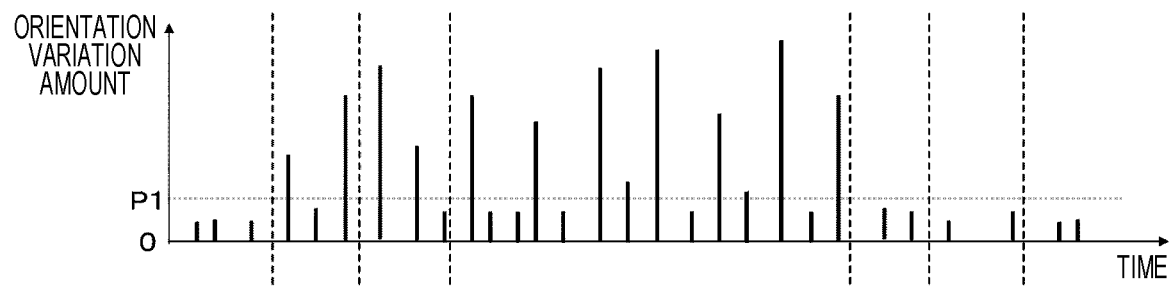
FIGS. 2A, 2B, 2C, and 2D are diagrams showing waveform examples of the respective sections in the audio signal processing device 100 in the first embodiment of the present technology.
Figure 2B:
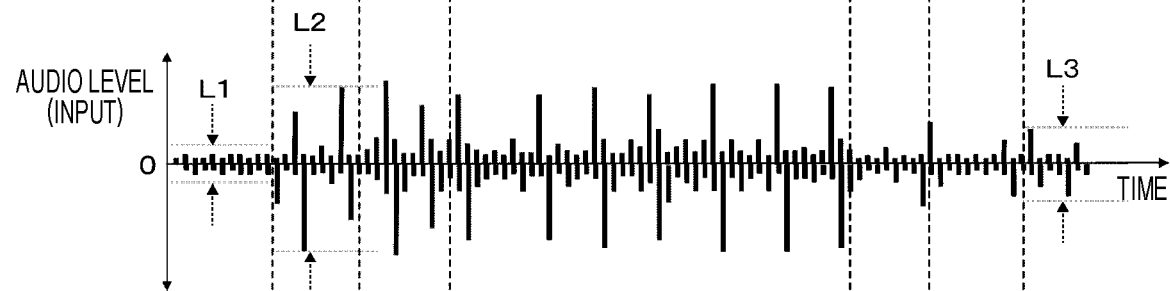
Figure 2C:
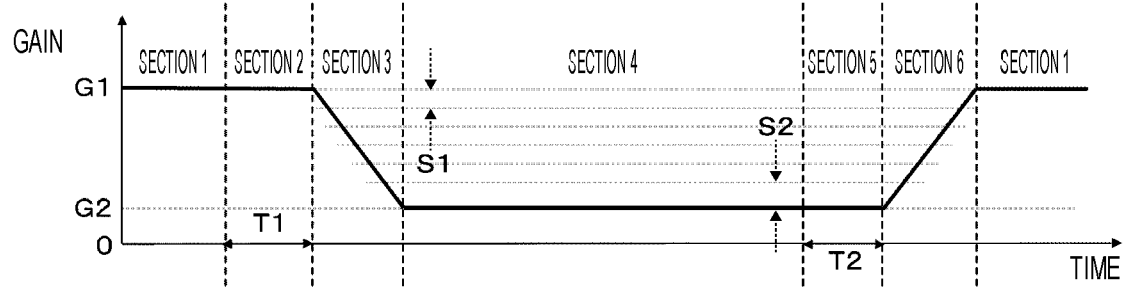
Figure 2D:
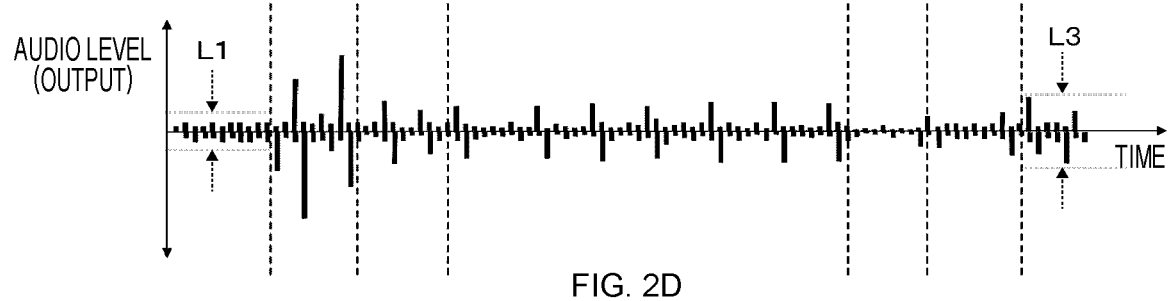

FIGS. 2A and 2B are diagrams showing waveform examples of the respective sections in the audio signal processing device 100 in the first embodiment of the present technology.

In the figure, a indicates changes in time of the orientation variation amount to be output from the orientation variation analysis unit 130. In the figure, b indicates changes in time of the audio signal to be output from the audio signal input unit 110. In the figure, c indicates a gain to be output from the controller 150, that is, changes in time of the gain for adjusting an audio signal level according to the audio signal and the orientation variation amount. In the figure, d indicates changes in time of the audio signal that has been adjusted by the audio signal adjustment unit 160. Consequently, it can be understood that the level of the audio signal is adjusted appropriately.

In this example, a target period is classified into six sections from a section 1 to a section 6. In these sections, the state transitions according to a magnitude or a duration of the orientation variation amount.

In the section 1, the orientation variation amount is smaller than a threshold value P1, and a level L1 of the audio signal with respect to a gain G1 is acquired. It is to be noted that in the section 1 of a second round, an audio signal level L3 is to be newly acquired.

The section 2 is a state in which the orientation variation amount is larger than the threshold value P1 continues for a period of time T1 or more. In such a section 2, a maximum level L2 of the audio signal is acquired. Consequently, a target gain G2 is set as will be described later.

The section 3 is a state in which the level of the audio signal to be output is dropped by continuously lowering the gain from G1 to G2 by a predetermined step size S1.

The section 4 is a state in which the gain is fixed to G2, and the state in which the level of the audio signal to be output is also lowered is maintained.

The section 5 is a state in which the orientation variation amount is smaller than the threshold value P1 continues for a period of time T2 or more.

The section 6 is a state in which the level of the audio signal to be output is raised by continuously increasing the gain from G2 to G1 by a predetermined step size S2.

It is to be noted that in this example, the threshold values of the orientation variation amount are set to be the same P1. However, different threshold values may be used in the respective determinations.

[State Transition]

Figure 3:
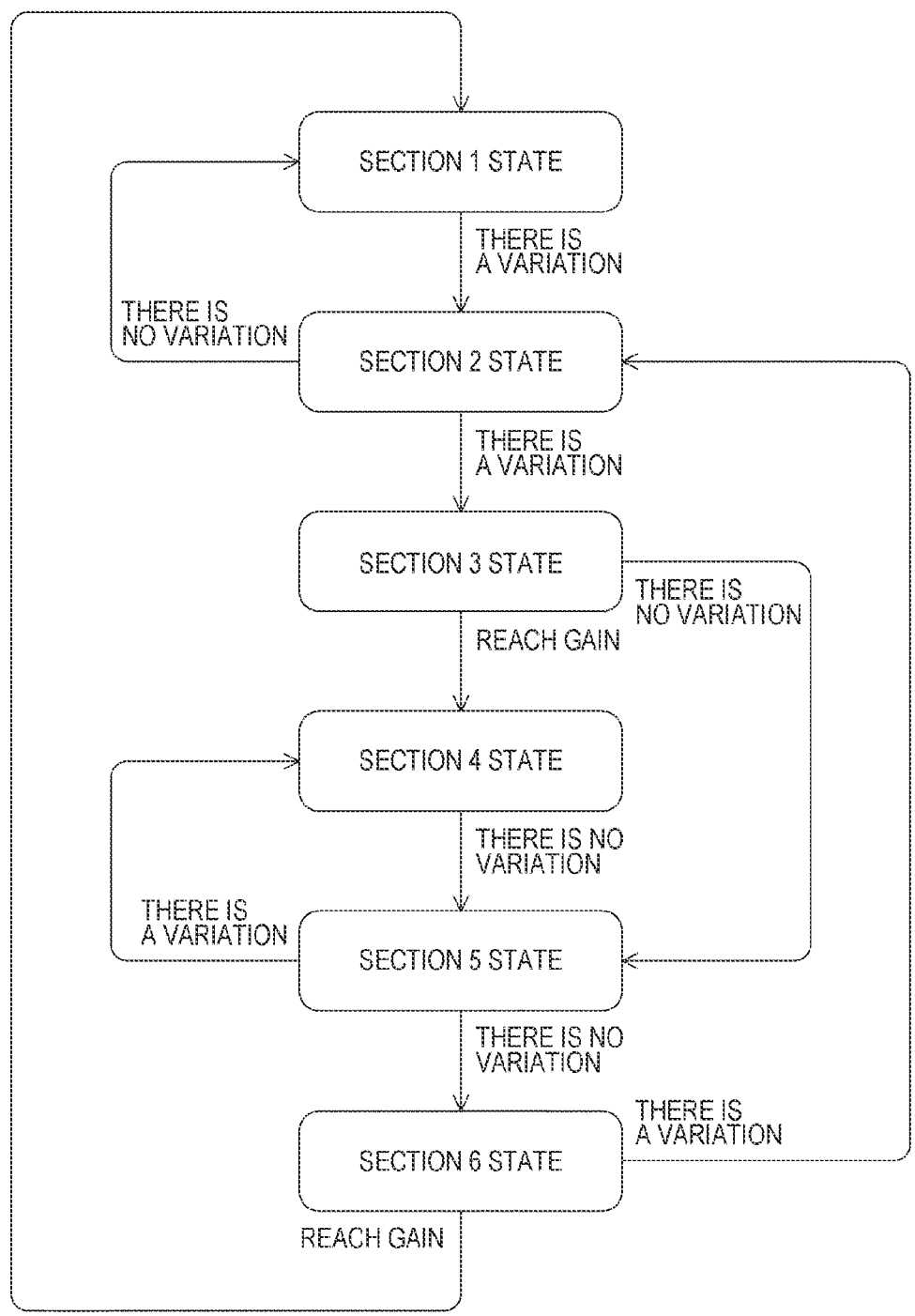
FIG. 3 is a diagram showing an example of state transitions among the respective sections in the first embodiment of the present technology.

FIG. 3 is a diagram showing an example of state transitions among the respective sections in the first embodiment of the present technology.

In the section 1, when the orientation variation amount becomes larger than the threshold value, the state transitions to the section 2.

In the section 2, when the state in which the orientation variation amount is larger than the threshold value continues for a certain period of time, the state transitions to the section 3. On the other hand, when the orientation variation amount becomes smaller before a certain period lapses, the state returns to the section 1.

In the section 3, while observing the orientation variation amount, in a case where the orientation variation amount is larger, the gain is gradually lowered to the target gain. When the orientation variation amount reaches the target gain, the state transitions to the section 4. On the other hand, when the orientation variation amount becomes smaller, the state transitions to the section 5.

In the section 4, while observing the orientation variation amount, the gain is continuously maintained in the case where the orientation variation amount is larger. When the orientation variation amount becomes smaller, the state transitions to the section 5.

In the section 5, when the state in which the orientation variation amount is smaller than the threshold value continues for a certain period of time, the state transitions to the section 6. On the other hand, when the orientation variation amount becomes larger before a certain period lapses, the state returns to the section 4.

In the section 6, while observing the orientation variation amount, when the orientation variation amount is smaller, the gain is gradually raised to the target gain. When the orientation variation amount reaches the target gain, the state transitions to the section 1. On the other hand, when the orientation variation amount becomes larger, the state transitions to the section 2.

[Operation]

Figure 4:
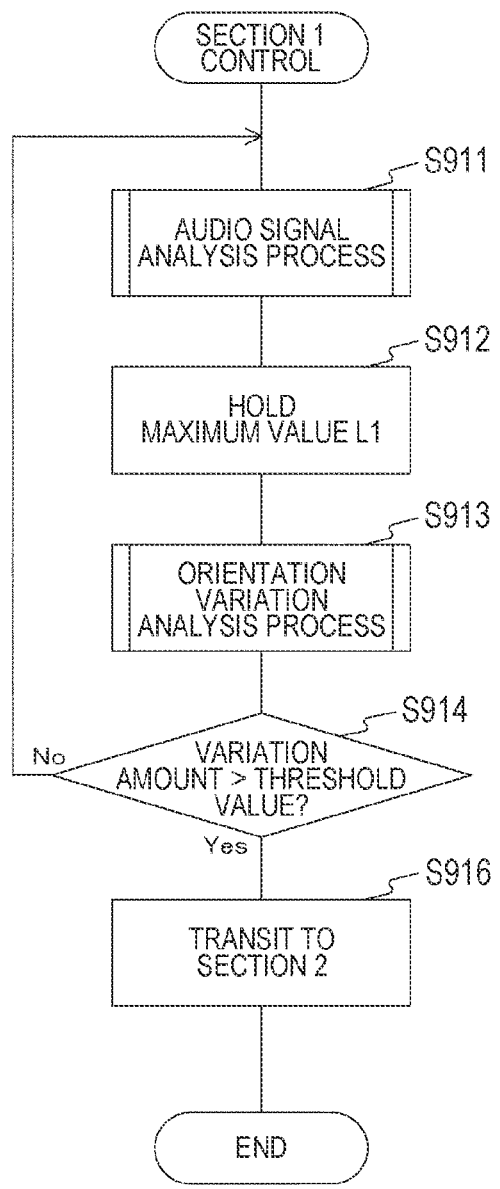
FIG. 4 is a diagram showing an example of a control processing procedure in a section 1 in the first embodiment of the present technology.

FIG. 4 is a diagram showing an example of a control processing procedure in the section 1 in the first embodiment of the present technology.

The audio signal analysis unit 140 analyzes the audio signal that has been supplied from the audio signal input unit 110, and detects a feature amount (step S911). Then, as the feature amount, for example, the maximum level L1 of the audio signal is held (step S912).

The orientation variation analysis unit 130 analyzes the orientation of the audio signal processing device 100 on the basis of orientation information that has been supplied from the sensor signal input unit 120, and detects the orientation variation amount (step S913).

The controller 150 compares the orientation variation amount with the threshold value P1 (step S914). In a case where the orientation variation amount is smaller than the threshold value P1 (step S914: No), as it is determined that there is no orientation variation, step S911 and subsequent steps are repeated. In a case where the orientation variation amount is larger than the threshold value P1 (step S914: Yes), as it is determined that there is an orientation variation, the state transitions to the section 2 (step S916).

Figure 5:
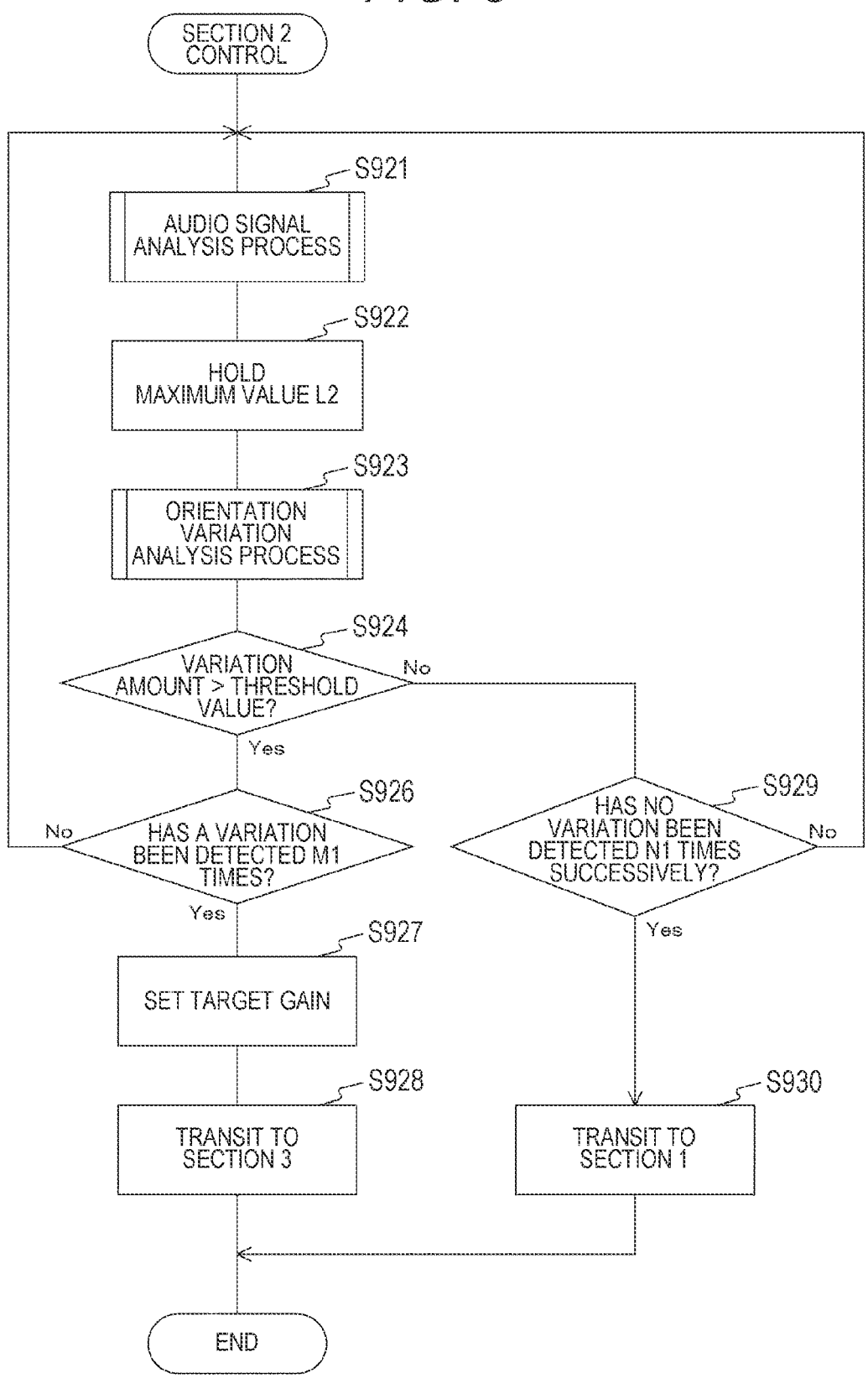
FIG. 5 is a diagram showing an example of the control processing procedure in a section 2 in the first embodiment of the present technology.

FIG. 5 is a diagram showing an example of the control processing procedure in the section 2 in the first embodiment of the present technology.

The audio signal analysis unit 140 analyzes the audio signal supplied from the audio signal input unit 110, and detects a feature amount (step S921). Then, as the feature amount, for example, the maximum level L2 of the audio signal is held (step S922).

The orientation variation analysis unit 130 analyzes the orientation of the audio signal processing device 100 on the basis of the orientation information that has been supplied from the sensor signal input unit 120, and detects an orientation variation amount (step S923).

The controller 150 compares the orientation variation amount with the threshold value P1 (step S924). In a case where the orientation variation amount is smaller than the threshold value P1 (step S924: No), it is determined that there is no orientation variation. On the other hand, in a case where the orientation variation amount is larger than the threshold value P1 (step S924: Yes), it is determined that there is an orientation variation.

In the state in which there is no variation amount, step S921 and subsequent processes are repeated (step S929: No). In a case where the state in which there is no variation amount has been detected N1 times successively (step S929: Yes), the state transitions to the section 1 (step S930).

In the state in which there is an orientation variation, step S921 and subsequent processes are repeated (step S926: No). In a case where the state in which there is an orientation variation has been detected M1 times, the target gain G2 corresponding to the maximum level L2 of the audio signal is set (step S927), the state transitions to the section 3 (step S928).

Here, the target gain G2 can be calculated by the following expression from the maximum level L2 of the audio signal in the section 2 to correspond to, for example, the maximum level L1 of the audio signal due to the gain G1 in a steady state in the section 1.

$$G2 = G1 \times L1/L2$$

It is to be noted that as a condition for transitioning from the section 2 to the section 3, the lapse of a waiting time T1 may be applicable instead of the detection times M1. In addition, minimization of the section 2 is enabled by setting either the number of detection times M1 or the waiting time T1 to 0.

Figure 6:
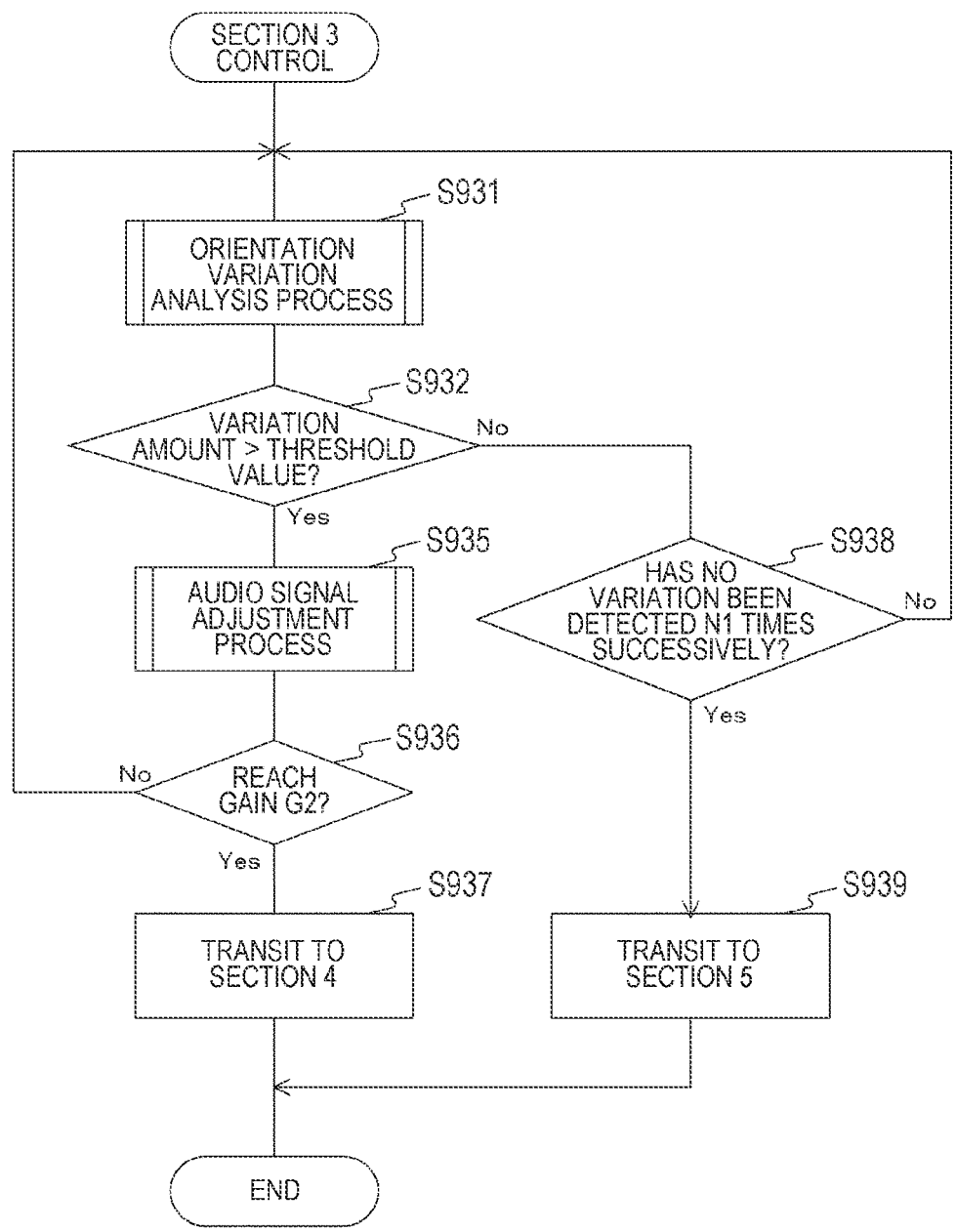
FIG. 6 is a diagram showing an example of the control processing procedure in a section 3 in the first embodiment of the present technology.

FIG. 6 is a diagram showing an example of the control processing procedure in the section 3 in the first embodiment of the present technology.

The orientation variation analysis unit 130 analyzes the orientation of the audio signal processing device 100 on the basis of the orientation information that has been supplied from the sensor signal input unit 120, and detects an orientation variation amount (step S931).

The controller 150 compares the orientation variation amount with the threshold value P1 (step S932).

In a case where the orientation variation amount is smaller than the threshold value P1 (step S932: No), it is determined that there is no orientation variation. On the other hand, in a case where the orientation variation amount is larger than the threshold value P1 (step S932: Yes), it is determined that there is an orientation variation.

In the state in which there is no variation amount, step S931 and subsequent processes are repeated (step S938: No). In a case where the state in which there is no variation amount has been detected N1 times successively (step S938: Yes), the state transitions to the section 5 (step S939).

In a state in which there is an orientation variation, the audio signal adjustment unit 160 adjusts the audio signal by multiplying the audio signal by the gain (step S935). As a specific example, whenever it is determined that the variation amount is larger (step S932: Yes), the current gain is lowered by a predetermined step size S1, and such a step size S1 is set by "an initial value G1 minus a target value G2", so that the section 3 can be skipped.

As a completion determination of an audio signal adjustment process, for example, it is determined whether or not the gain has been lowered to the target value G2 (step S936). Until the gain reaches the target value G2 (step S936: No), step S931 and subsequent steps are repeated. When the gain reaches the target value G2 (step S936: Yes), the state transitions to the section 4 (step S937).

Figure 7:
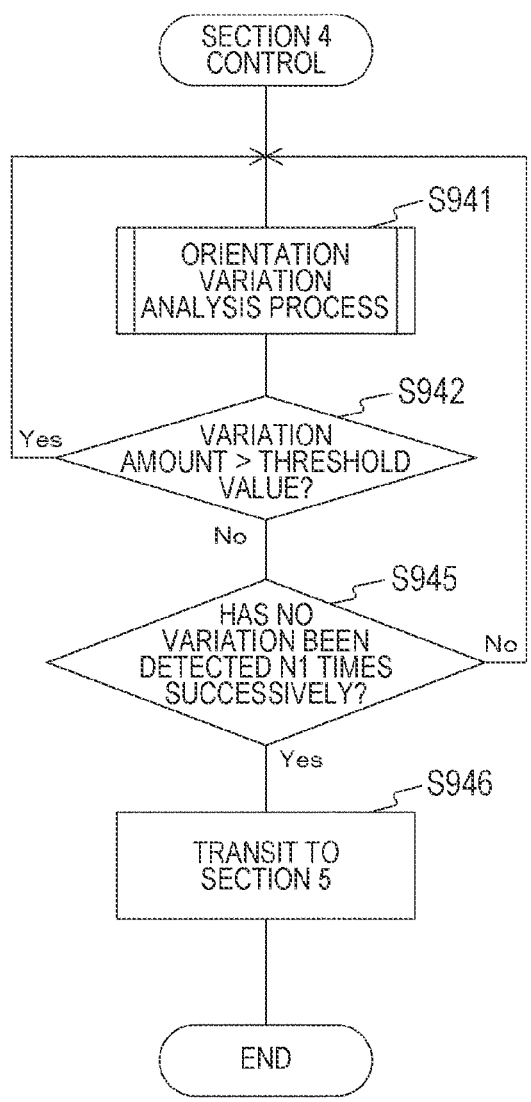
FIG. 7 is a diagram showing an example of the control processing procedure in a section 4 in the first embodiment of the present technology.

FIG. 7 is a diagram showing an example of the control processing procedure in the section 4 in the first embodiment of the present technology.

The orientation variation analysis unit 130 analyzes the orientation of the audio signal processing device 100 on the basis of the orientation information that has been supplied from the sensor signal input unit 120, and detects an orientation variation amount (step S941).

The controller 150 compares the orientation variation amount with the threshold value P1 (step S942). In case where the orientation variation amount is smaller than the threshold value P1 (step S942: No), it is determined that there is no orientation variation. On the other hand, when the orientation variation amount is larger than the threshold value P1 (step S942: Yes), as it is determined that there is an orientation variation, step S941 and subsequent processes are repeated.

In the state in which there is no variation amount, step S941 and subsequent processes are repeated (step S945: No). In a case where the state in which there is no variation amount has been detected N1 times successively (step S945: Yes), the state transitions to the section 5 (step S946).

Figure 8:
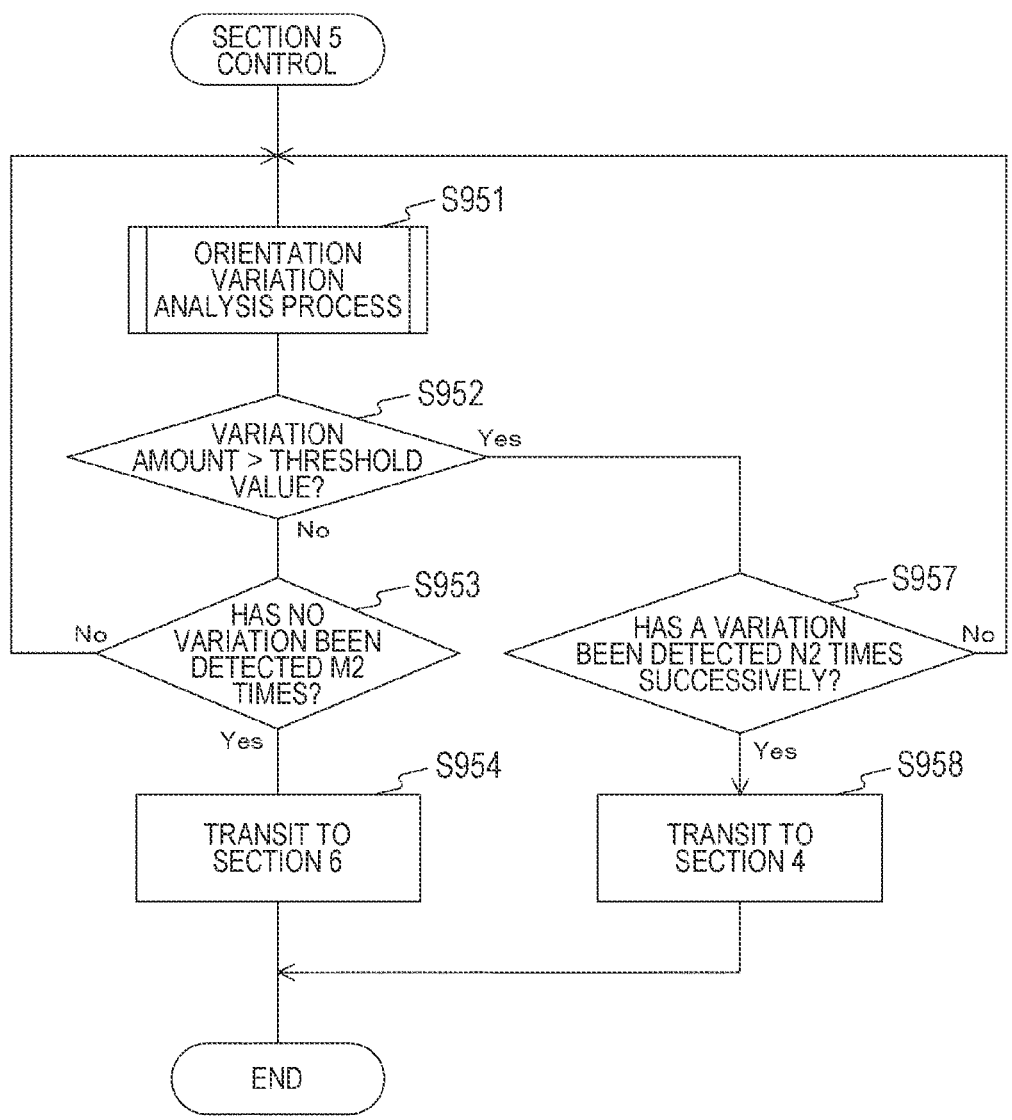
FIG. 8 is a diagram showing an example of the control processing procedure in a section 5 in the first embodiment of the present technology.

FIG. 8 is a diagram showing an example of the control processing procedure in the section 5 in the first embodiment of the present technology.

The orientation variation analysis unit 130 analyzes the orientation of the audio signal processing device 100 on the basis of the orientation information that has been supplied from the sensor signal input unit 120, and detects an orientation variation amount (step S951).

The controller 150 compares the orientation variation amount with the threshold value P1 (step S952). In a case where the orientation variation amount is smaller than the threshold value P1 (step S952: No), it is determined that there is no orientation variation. On the other hand, in a case where the orientation variation amount is larger than the threshold value P1 (step S952: Yes), it is determined that there is an orientation variation.

In the state in which there is no variation amount, step S951 and subsequent processes are repeated (step S953: No). In a case where the state in which there is no variation amount has been detected M2 times successively (step S953: Yes), the state transitions to the section 6 (step S954).

In the state in which there is an orientation variation, step S951 and subsequent processes are repeated (step S957: No). In a case where the state in which there is an orientation variation has been detected N2 times (step S957: Yes), the state transitions to the section 4 (step S958).

It is to be noted that as a condition for transitioning from the section 5 to the section 6, the lapse of a waiting time T2 may be applicable instead of the detection times M2. In addition, minimization of the section 5 is enabled by setting either the number of detection times M2 or the waiting time T2 to 0.

Figure 9:
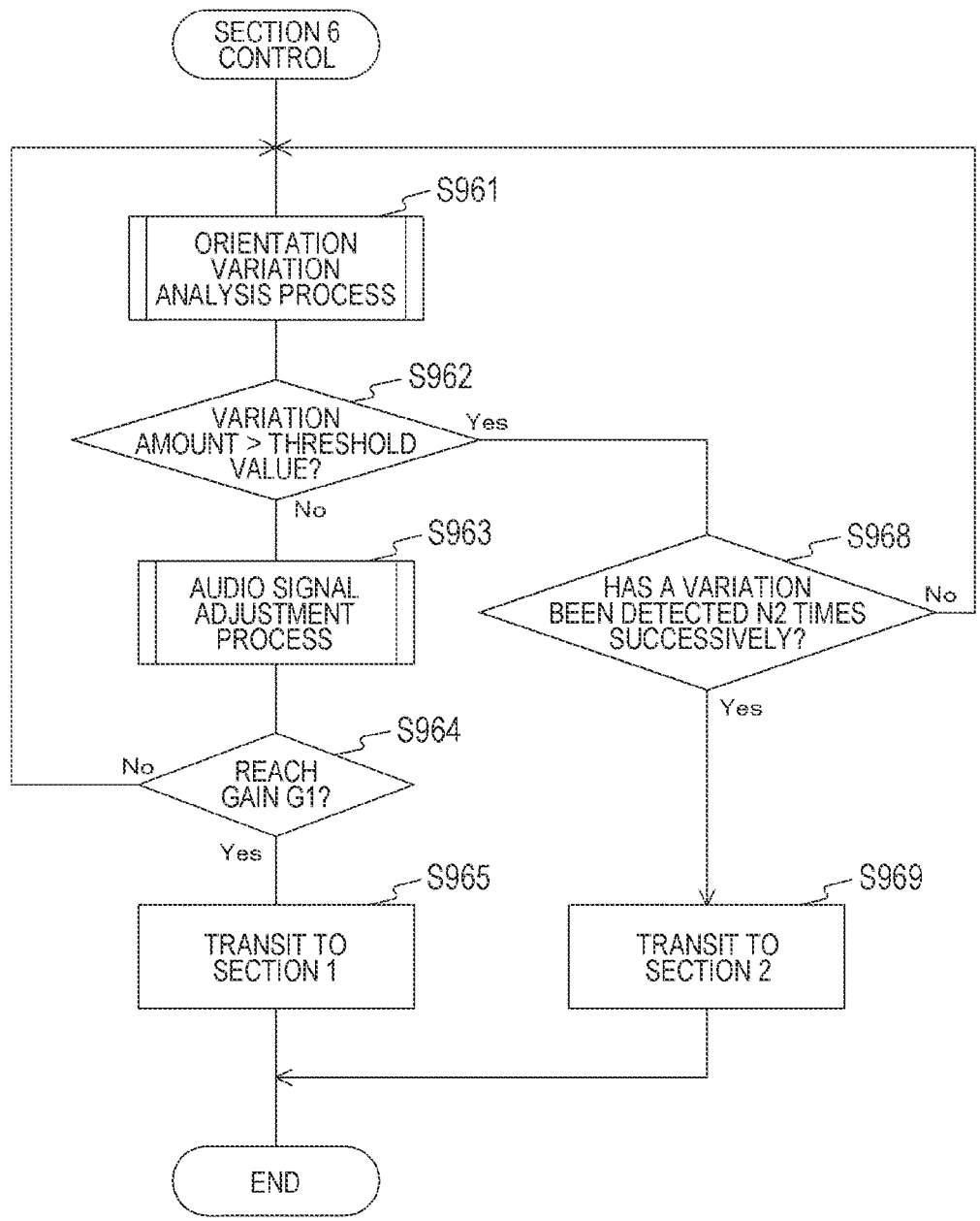
FIG. 9 is a diagram showing an example of the control processing procedure in a section 6 in the first embodiment of the present technology.

FIG. 9 is a diagram showing an example of the control processing procedure in the section 6 in the first embodiment of the present technology.

The orientation variation analysis unit 130 analyzes the orientation of the audio signal processing device 100 on the basis of the orientation information that has been supplied from the sensor signal input unit 120, and detects an orientation variation amount (step S961).

The controller 150 compares the orientation variation amount with the threshold value P1 (step S962). In a case where the orientation variation amount is smaller than the threshold value P1 (step S962: No), it is determined that there is no orientation variation. On the other hand, in a case where the orientation variation amount is larger than the threshold value P1 (step S962: Yes), it is determined that there is an orientation variation.

In the state in which there is a variation amount, step S961 and subsequent processes are repeated (step S968: No). In a case where the state in which there is a variation amount has been detected N2 times successively (step S968: Yes), the state transitions to the section 2 (step S969).

In the state in which there is no orientation variation, the audio signal adjustment unit 160 adjusts the audio signal by multiplying the audio signal by the gain (step S963). As a specific example, whenever it is determined that the variation amount is smaller (step S962: No), the current gain is raised by a predetermined step size S2, and such a step size S2 is set by "the initial value G1 minus the target value G2", so that the section 6 can be skipped.

As a completion determination of the audio signal adjustment process, for example, it is determined whether or not the gain has been raised to the target value G1 (step S964). Until the gain reaches the target value G1 (step S964: No), step S961 and subsequent steps are repeated. When the gain reaches the target value G1 (step S964: Yes), the state transitions to the section 1 (step S965).

Figure 10:
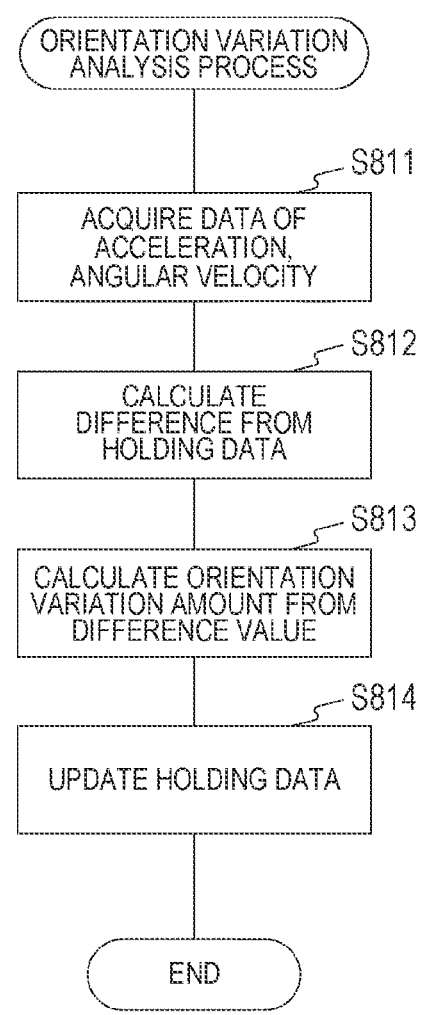
FIG. 10 is a diagram showing an example of a processing procedure of an orientation variation analysis process in the first embodiment of the present technology.

FIG. 10 is a diagram showing an example of a processing procedure of an orientation variation analysis process in the first embodiment of the present technology.

The orientation variation analysis unit 130 acquires orientation information such as an acceleration or an angular velocity from the sensor signal input unit 120 (step S811). Then, the orientation variation analysis unit 130 calculates a difference between newly acquired orientation information and previously held data (step S812), and calculates an orientation variation amount from the difference value (step S813). Then, the orientation variation analysis unit 130 updates and holds the newly calculated orientation variation amount as new data (step S814).

Figure 11:
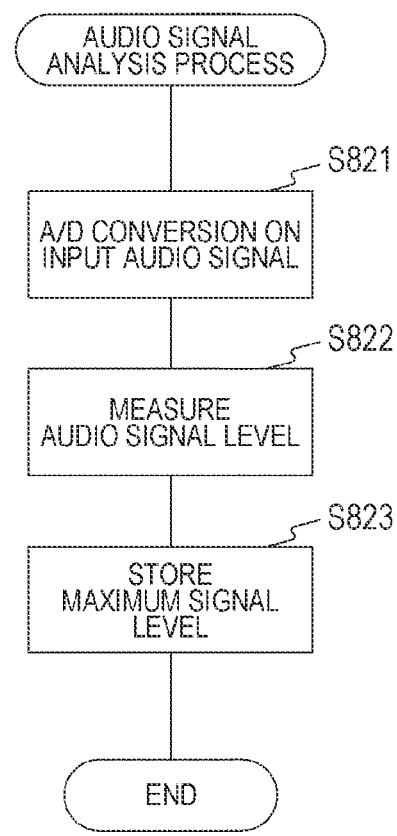
FIG. 11 is a diagram showing an example of a processing procedure of an audio signal analysis process in the first embodiment of the present technology.

FIG. 11 is a diagram showing an example of a processing procedure of an audio signal analysis process in the first embodiment of the present technology.

The audio signal input unit 110 carries out an A/D conversion on the audio signal that has been input (step S821). The audio signal analysis unit 140 measures the signal level of the audio data that has been supplied from the audio signal input unit 110, detects a maximum value in the measurement section, and supplies the controller 150 with the maximum value (step S822).

Further, the audio signal analysis unit 140 temporarily stores the maximum value of the signal level (step S823). Here, the maximum value of the signal level to be stored is updated, whenever the audio analysis process is performed.

Figure 12:
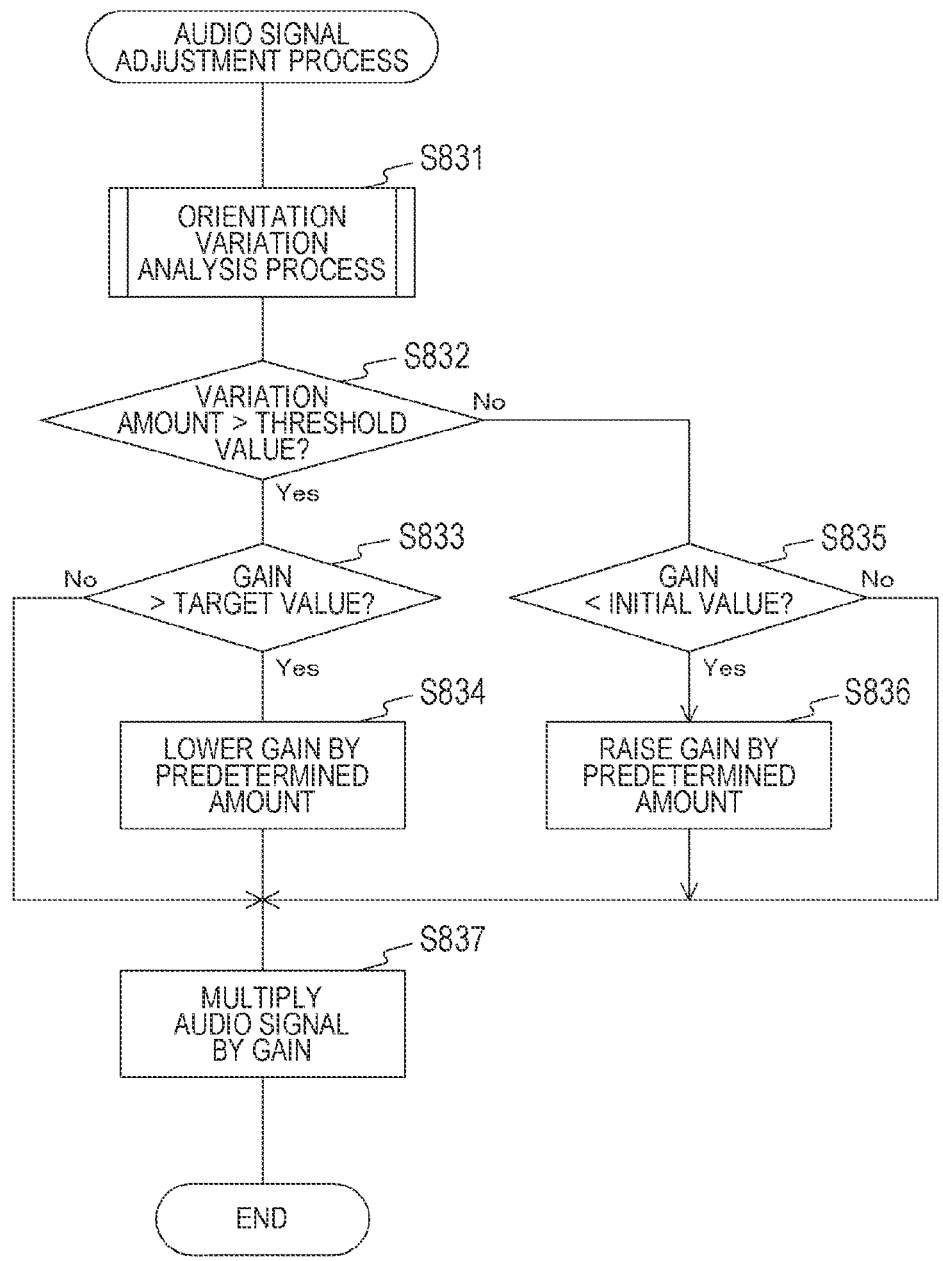
FIG. 12 is a diagram showing an example of a processing procedure of an audio signal adjustment process in the first embodiment of the present technology.

FIG. 12 is a diagram showing an example of a processing procedure of the audio signal adjustment process in the first embodiment of the present technology.

The orientation variation analysis unit 130 analyzes the orientation of the audio signal processing device 100 on the basis of the orientation information that has been supplied from the sensor signal input unit 120, and detects an orientation variation amount (step S831).

The controller 150 compares the orientation variation amount with the threshold value P1 (step S832). In a case where the orientation variation amount is smaller than the threshold value P1 (step S832: No), it is determined that there is no orientation variation. On the other hand, in a case where the orientation variation amount is larger than the threshold value P1 (step S832: Yes), it is determined that there is an orientation variation.

In the state in which there is an orientation variation, in a case where the gain does not reach the target value G2 (step S833: Yes), the gain is made smaller by a predetermined width S1 (step S834). On the other hand, in the state in which there is no variation amount, in a case where the gain does not reach the initial value G1 (step S835: Yes), the gain is increased by a predetermined width S2 (step S836).

The audio signal adjustment unit 160 adjusts the audio signal by multiplying the audio signal that has been supplied from the audio signal input unit 110 by the gain that has been updated and that has been supplied from the controller 150 (step S837).

In this manner, in the first embodiment of the present technology, the audio signal adjustment unit 160 adjusts the audio signal according to the orientation variation amount that has been generated by the orientation variation analysis unit 130 toward the target value that has been set by the audio signal analysis unit 140. Consequently, an adjustment of the audio signal according to the orientation variation amount is enabled to correspond to the surrounding audio condition. For example, it is possible to suppress a noise, which is included in an audio signal that has been acquired with attached to a human body or a device body, and which is caused by an orientation variation or a vibration. Further, by bringing the noise suppression into effect on the orientation variation in a stepwise manner, the sense of incongruity can be prevented from appearing on the reproduced audio.

2. Second Embodiment

In the first embodiment described above, the level of the audio signal has been adjusted according to the orientation variation amount. On the other hand, in the present second embodiment, the frequency spectrum of the audio signal is adjusted.

[Frequency Spectrum]

Figure 13:
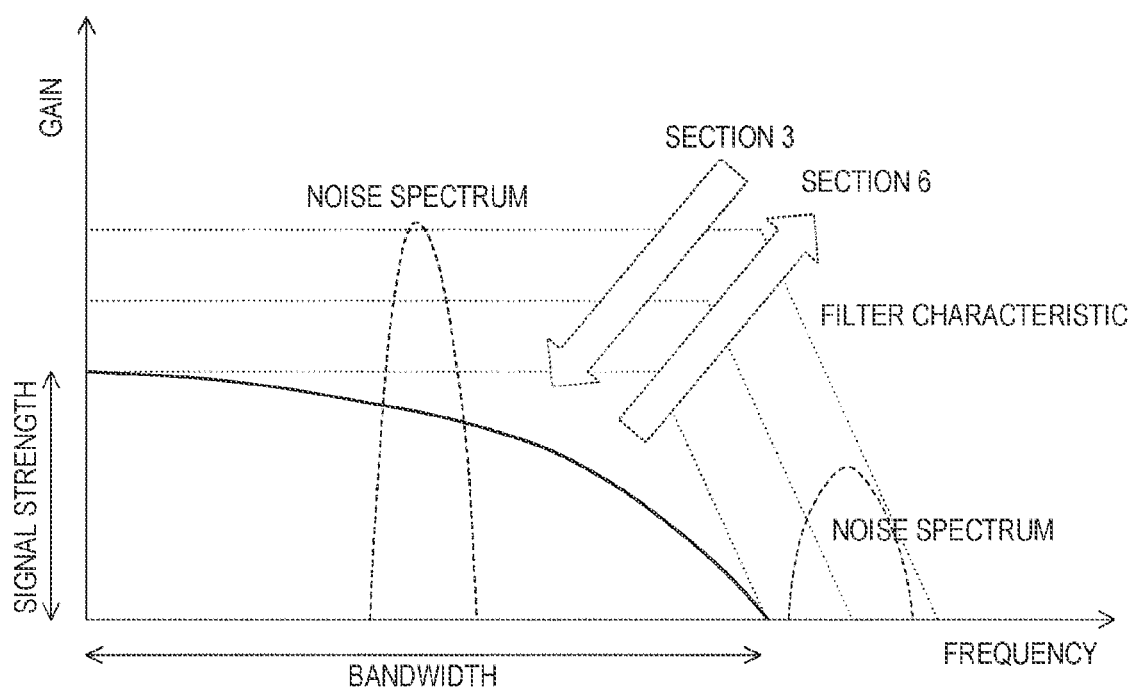
FIG. 13 is a diagram showing an example of adjusting a frequency spectrum of an audio signal in a second embodiment of the present technology.

FIG. 13 is a diagram showing an example of adjusting the frequency spectrum of the audio signal in a second embodiment of the present technology.

Here, regarding an audio signal, the horizontal axis indicates frequency and the vertical axis indicates gain. In normal times, the audio signal has a distribution of a constant bandwidth and signal strength as indicated by a solid line. On the other hand, when a noise is generated, the noise spectrum may be distributed at frequencies other than the bandwidth in normal times, or the noise spectrum may appear as a strong signal even within the bandwidth.

Therefore, in the present second embodiment, the audio signal analysis unit 140 carries out a spectrum analysis of the audio signal, and in addition, the audio signal adjustment unit 160 is provided with a filter, so that the filter characteristic is switched according to a result of the spectrum analysis.

Specifically, in the section 3, a filter characteristic indicated by a downward arrow is applied in a stepwise manner in a state in which there is an orientation variation, so that the filter characteristic is switched to have a low gain and a narrow band. On the other hand, in the section 6, a filter characteristic indicated by an upward arrow is applied in a stepwise manner in a state in which there is no orientation variation, so that the filter characteristic is switched to have a high gain and a wide band, and a signal without being filtered is finally output.

It is to be noted that the overall configuration in the present second embodiment is similar to that in the first embodiment described above. Therefore, the detailed description will be omitted.

[Operation]

Figure 14:
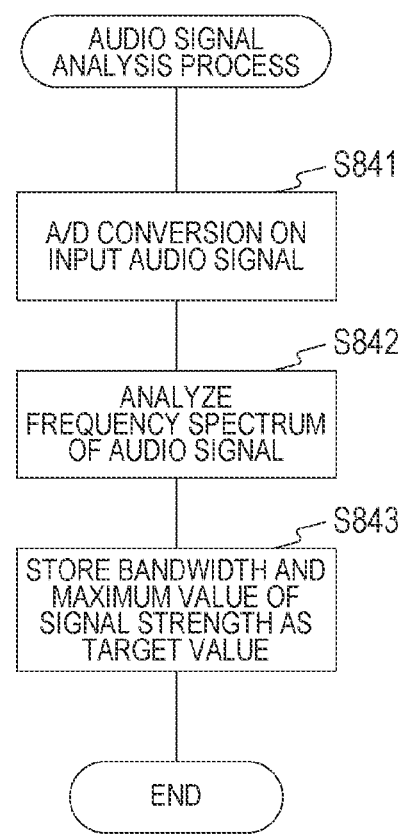
FIG. 14 is a diagram showing an example of a processing procedure of an audio signal analysis process in the second embodiment of the present technology.

FIG. 14 is a diagram showing an example of a processing procedure of an audio signal analysis process in the second embodiment of the present technology.

The audio signal input unit 110 carries out an A/D conversion on the audio signal that has been input (step S841). The audio signal analysis unit 140 analyzes the frequency spectrum of the audio data that has been supplied from the audio signal input unit 110, detects a bandwidth and a maximum value of a signal strength of the frequency spectrum in an analysis section, and supplies the controller 150 with the bandwidth and the maximum value of the signal strength (Step S842).

In addition, the audio signal analysis unit 140 temporarily stores the bandwidth and the signal strength of the frequency spectrum (step S843). Here, the bandwidth and the maximum value of the signal strength of the frequency spectrum to be stored are updated whenever the audio analysis process is performed.

Figure 15:
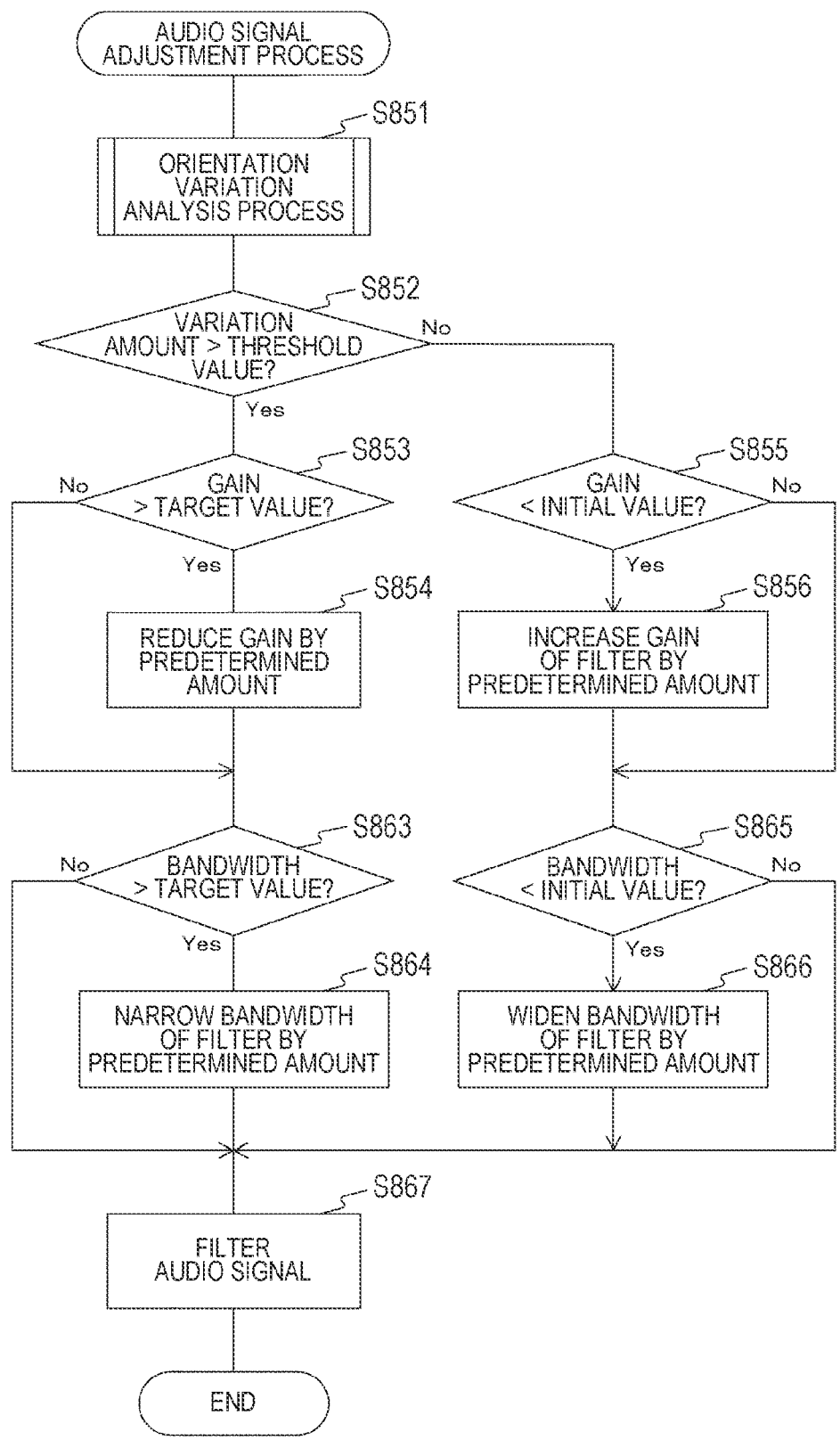
FIG. 15 is a diagram showing an example of a processing procedure of an audio signal adjustment process in the second embodiment of the present technology.

FIG. 15 is a diagram showing an example of a processing procedure of an audio signal adjustment process in the second embodiment of the present technology.

The orientation variation analysis unit 130 analyzes the orientation of the audio signal processing device 100 on the basis of the orientation information that has been supplied from the sensor signal input unit 120, and detects an orientation variation amount (step S851).

The controller 150 compares the orientation variation amount with a threshold value (step S852). In a case where the orientation variation amount is smaller than the threshold value (step S852: No), it is determined that there is no orientation variation. On the other hand, in a case where the orientation variation amount is larger than the threshold value (step S852: Yes), it is determined that there is an orientation variation.

In the state in which there is the orientation variation, in a case where the gain does not reach the target value (step S853: Yes), the gain is made smaller by a predetermined width (step S854). In addition, in a case where the current bandwidth has not reached the target value (step S863: Yes), the bandwidth is narrowed by a predetermined width (step S864).

On the other hand, in the state in which there is no variation amount, in a case where the gain does not reach an initial value (step S855: Yes), the gain is increased by a predetermined width (step S856). In addition, in a case where the current bandwidth does not reach an initial value (step S865: Yes), the bandwidth is widened by a predetermined width (step S866).

The audio signal adjustment unit 160 adjusts the audio signal by filtering the audio signal that has been supplied from the audio signal input unit 110 by using the characteristic that has been supplied from the controller 150 (step S867).

In this manner, according to the second embodiment of the present technology, the audio signal is adjusted by the audio signal adjustment unit 160 by using the filter characteristic according to the orientation variation amount that has been generated by the orientation variation analysis unit 130.

3. Third Embodiment

In the first embodiment described above, the input audio signal has been adjusted in real time. On the other hand, in the present third embodiment, an audio signal and a sensor signal are recorded, the orientation variation is analyzed from the sensor signal when the audio signal is reproduced, and the audio signal is adjusted on the basis of this.

[Configuration of Audio Signal Processing Device]

Figure 16:
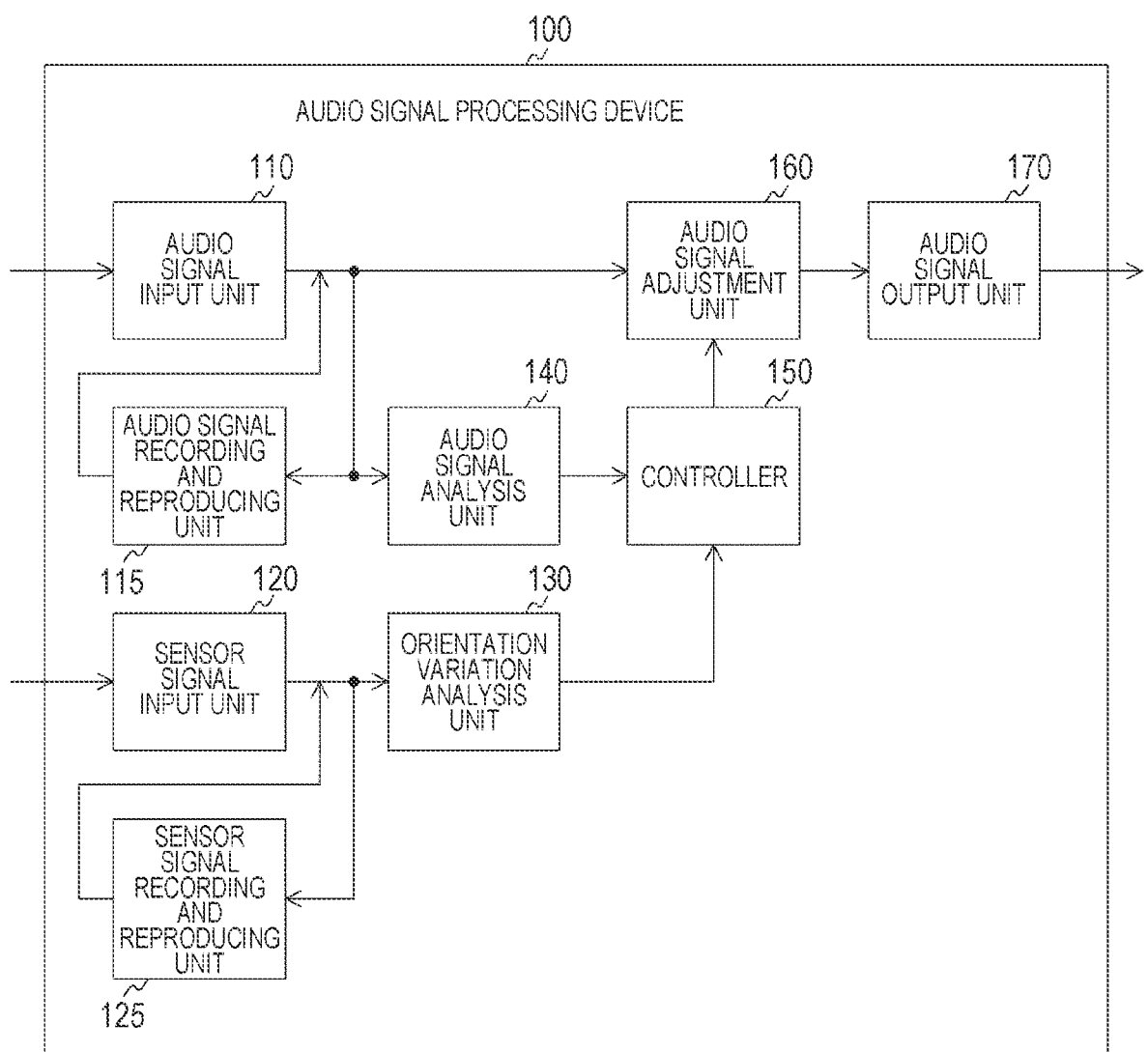
FIG. 16 is a diagram showing a configuration example of an audio signal processing device 100 in a third embodiment of the present technology.

FIG. 16 is a diagram showing a configuration example of the audio signal processing device 100 in the third embodiment of the present technology.

The audio signal processing device 100 in the present third embodiment is different in that an audio signal recording and reproducing unit 115 and a sensor signal recording and reproducing unit 125 are provided in addition to the above-described first embodiment. Other points are similar to those in the first embodiment described above.

The audio signal recording and reproducing unit 115 records and reproduces an audio signal. The sensor signal recording and reproducing unit 125 records and reproduces a sensor signal. It is to be noted that the audio signal recording and reproducing unit 115 and the sensor signal recording and reproducing unit 125 are examples of a recording and reproducing unit described within the scope of claims.

The audio signal recording and reproducing unit 115 records audio data from the audio signal input unit 110 at the time of recording data. The sensor signal recording and reproducing unit 125 records orientation information such as an acceleration or an angular velocity from the sensor signal input unit 120 at the time of recording data. The audio signal recording and reproducing unit 115 and the sensor signal recording and reproducing unit 125 record data in synchronization with each other.

At the time of reproducing data, the audio signal recording and reproducing unit 115 and the sensor signal recording and reproducing unit 125 respectively reproduce the audio signal and the sensor signal in synchronization with each other, and respectively supply the audio signal analysis unit 140 and the orientation variation analysis unit 130 with the audio signal and the sensor signal. Subsequent processes are similar to those in the first embodiment described above.

In this manner, according to the third embodiment of the present technology, the audio signal can be adjusted at the time of being reproduced, on the basis of the audio signal and the sensor signal that have been respectively recorded in the audio signal recording and reproducing unit 115 and the sensor signal recording and reproducing unit 125.

4. Fourth Embodiment

In the first embodiment described above, the adjustment based on the orientation variation amount has been carried out on the audio signal. However, in the present fourth embodiment, additionally, a correction based on the orientation variation amount is also carried out on an image signal.

[Configuration of Audio Signal Processing Device]

Figure 17:
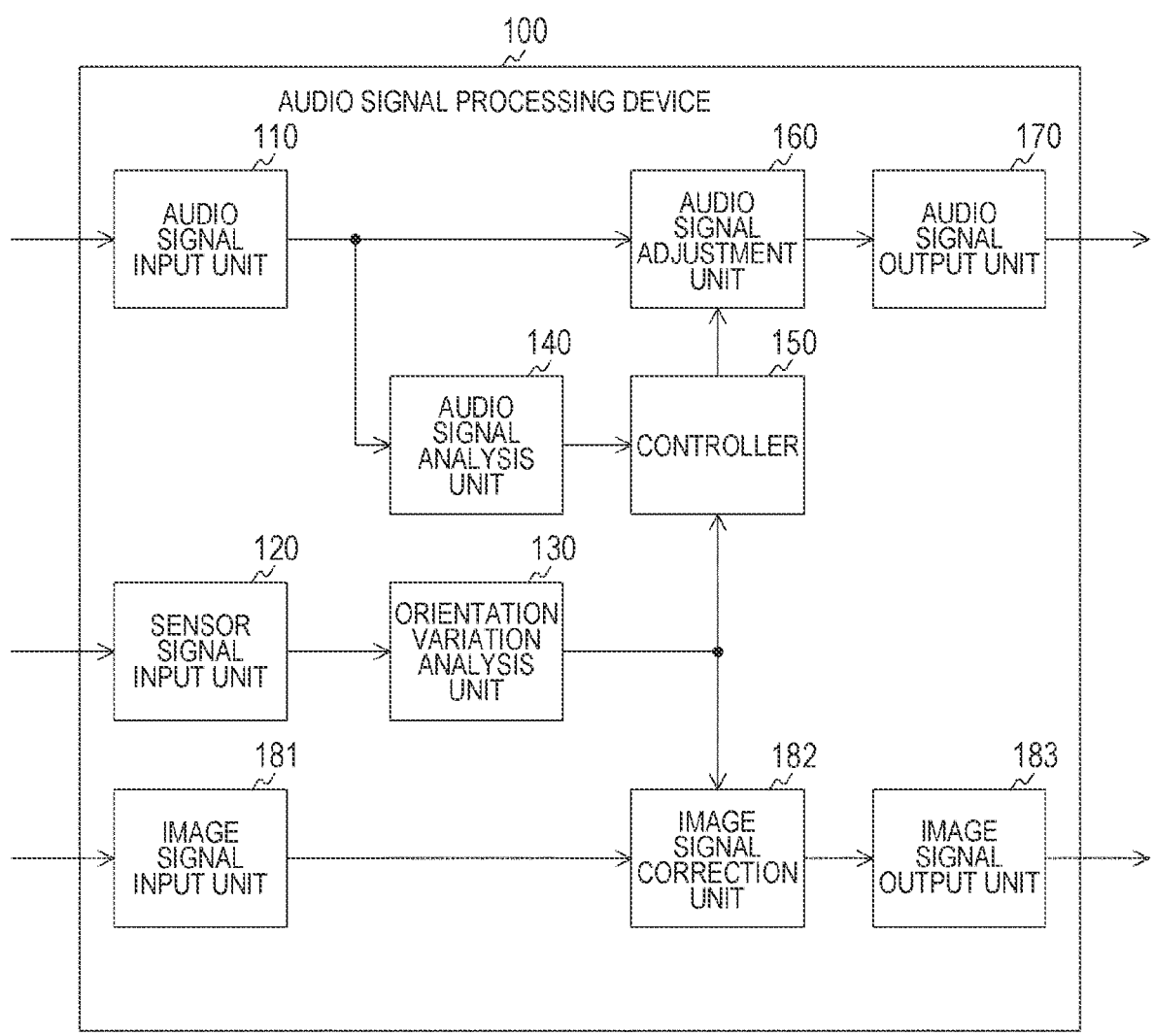
FIG. 17 is a diagram showing a configuration example of an audio signal processing device 100 in a fourth embodiment of the present technology.

FIG. 17 is a diagram showing a configuration example of the audio signal processing device 100 in the fourth embodiment of the present technology.

The audio signal processing device 100 in the present fourth embodiment is different in that an image signal input unit 181, an image signal correction unit 182, and an image signal output unit 183 are provided in addition to the above-described first embodiment. Other points are similar to those in the first embodiment described above.

The image signal input unit 181 receives an image signal supplied from an image sensor (not shown), and supplies the image signal correction unit 182 with the image signal as an image frame. The image signal correction unit 182 carries out a blur correction by performing a trapezoid correction process on the image frame from the image signal input unit 181 on the basis of the orientation variation amount from the orientation variation analysis unit 130. The image signal output unit 183 outputs the image signal that has been subject to the blur correction in the image signal correction unit 182. Consequently, in a similar manner to the adjustment of the audio signal, the blur correction based on the orientation variation amount is also carried out on the image signal.

In this manner, according to the fourth embodiment of the present technology, in addition to the adjustment of the audio signal, the image signal correction unit 182 is also capable of correcting the image signal on the basis of the orientation variation amount. That is, at the same time with the hand shake correction of the image, suppression of a noise at the time of hand shaking is enabled from the audio to be reproduced.

5. Fifth Embodiment

In the above-described first embodiment, the noise of the audio signal caused by the orientation variation has been suppressed by adjusting the audio signal according to the orientation variation amount. In this case, there can be a possibility that the gain of the audio signal is lowered even when no noise is generated due to the orientation variation. Therefore, in the present fifth embodiment, only in a case where a correlation between an orientation variation and an audio variation is high, the audio signal is adjusted, so that the audio signal is not adjusted in a case where there is no variation in the audio although there is an orientation variation.

[Configuration of Audio Signal Processing Device]

Figure 18:
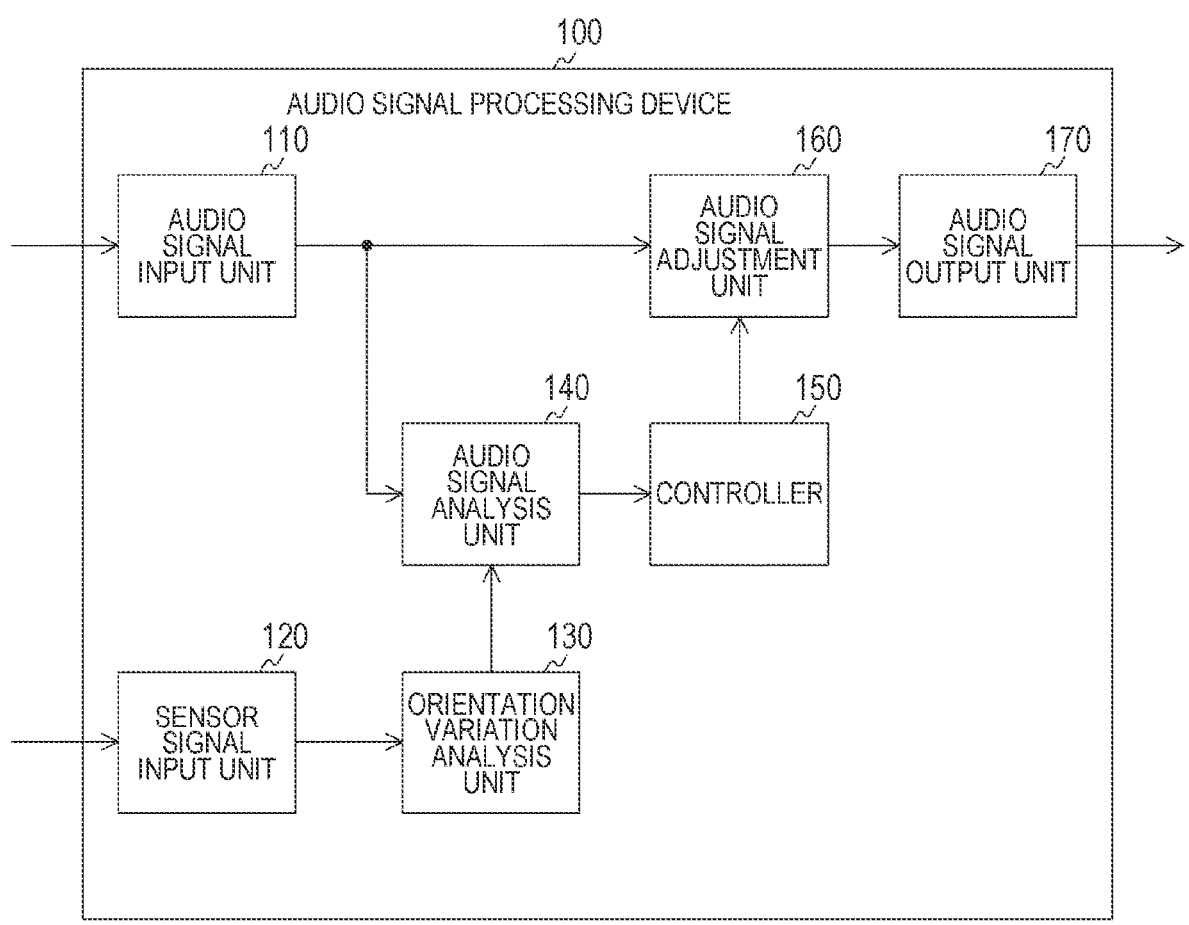
FIG. 18 is a diagram showing a configuration example of an audio signal processing device 100 in a fifth embodiment of the present technology.

FIG. 18 is a diagram showing a configuration example of the audio signal processing device 100 in the fifth embodiment of the present technology.

In the audio signal processing device 100 in the present fifth embodiment, the audio signal analysis unit 140 calculates a correlation value between the audio signal from the audio signal input unit 110 and the orientation variation amount from the orientation variation analysis unit 130. In the calculation of a correlation value, the correlation value becomes high in a case where the orientation variation amount is large and larger than the audio level in the section 1, whereas the correlation value becomes low in a case where the audio level is small although the orientation variation amount is large.

The controller 150 controls the audio signal adjustment unit 160 to perform the audio signal adjustment process only in the case where the correlation value is high, on the basis of the correlation value from the audio signal analysis unit 140.

[Operation]

Figure 19:
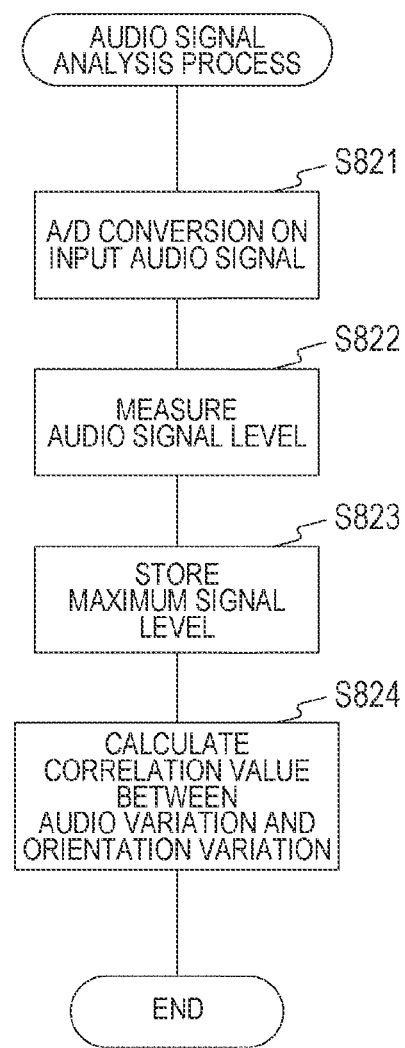
FIG. 19 is a diagram showing an example of a processing procedure of an audio signal analysis process in the fifth embodiment of the present technology.

FIG. 19 is a diagram showing an example of a processing procedure of an audio signal analysis process in the fifth embodiment of the present technology.

In the audio signal analysis process in the present fifth embodiment, in addition to the process in the first embodiment described above, the audio signal analysis unit 140 calculates a correlation value between the audio signal from the audio signal input unit 110 and the orientation variation amount from the orientation variation analysis unit 130 (step S824). Such a calculated correlation value is supplied to the controller 150.

Figure 20:
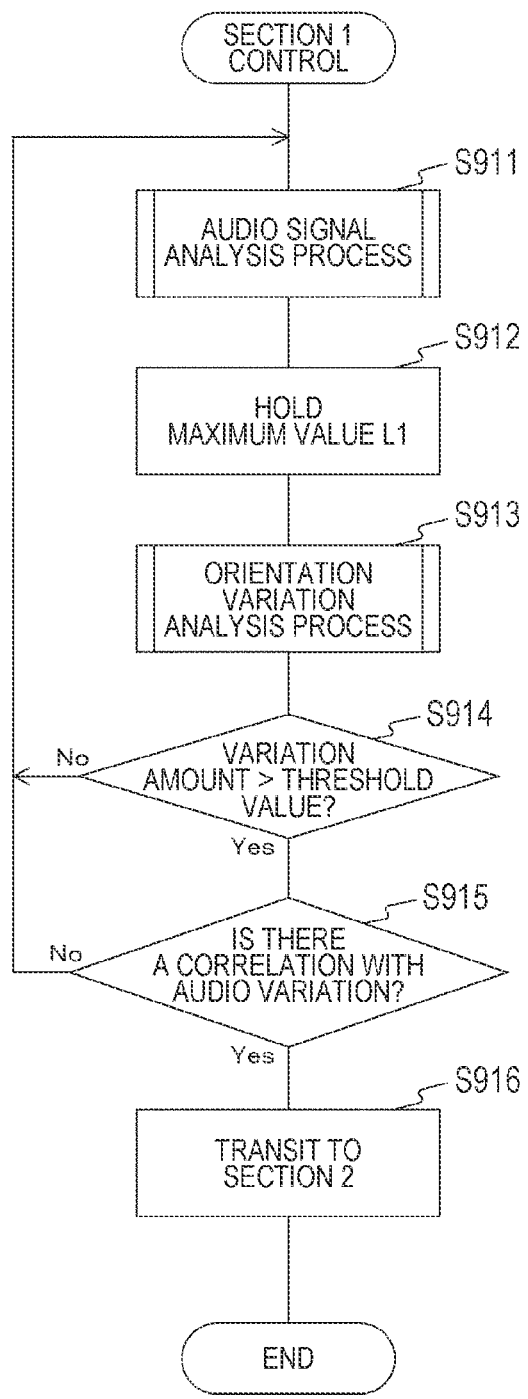
FIG. 20 is a diagram showing an example of a control processing procedure in a section 1 in the fifth embodiment of the present technology.

FIG. 20 is a diagram showing an example of the control processing procedure in a section 1 in the fifth embodiment of the present technology.

In the control in the section 1 in the present fifth embodiment, in addition to the process in the first embodiment described above, in a case where there is an orientation variation, the controller 150 determines whether or not the orientation variation correlates with the audio variation on the basis of a correlation value from the audio signal analysis unit 140 (step S915). In a case where it is determined that there is no correlation (step S915: No), as it is determined that there has been no such an orientation variation, step S911 and subsequent processes are repeated. In a case where it is determined that there is a correlation (step S915: Yes), as it is determined that the orientation variation is meaningful, the state transitions to a section 2 (step S916).

Figure 21:
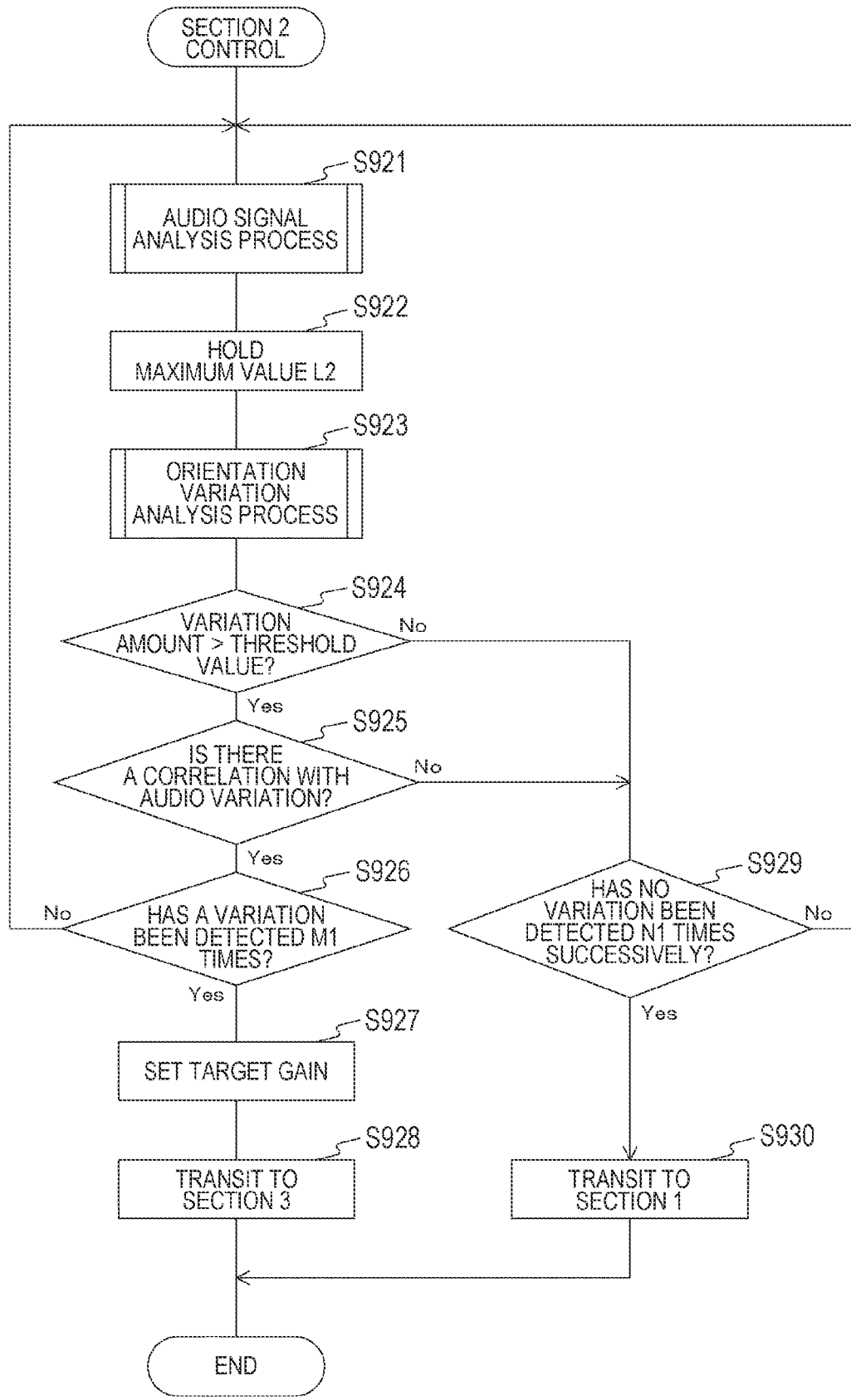
FIG. 21 is a diagram showing an example of the control processing procedure in a section 2 in the fifth embodiment of the present technology.

FIG. 21 is a diagram showing an example of the control processing procedure in the section 2 in the fifth embodiment of the present technology.

In the control in the section 2 in the present fifth embodiment, in addition to the process in the first embodiment described above, in a case where there is an orientation variation, the controller 150 determines whether or not the orientation variation correlates with the audio variation on the basis of the correlation value from the audio signal analysis unit 140 (step S925). In a case where it is determined that there is no correlation (step S925: No), as it is determined that there has been no such an orientation variation, step S929 and subsequent processes are performed. In a case where it is determined that there is a correlation (step S925: Yes), as it is determined that the orientation variation is meaningful, step S926 and subsequent processes are performed.

Figure 22:
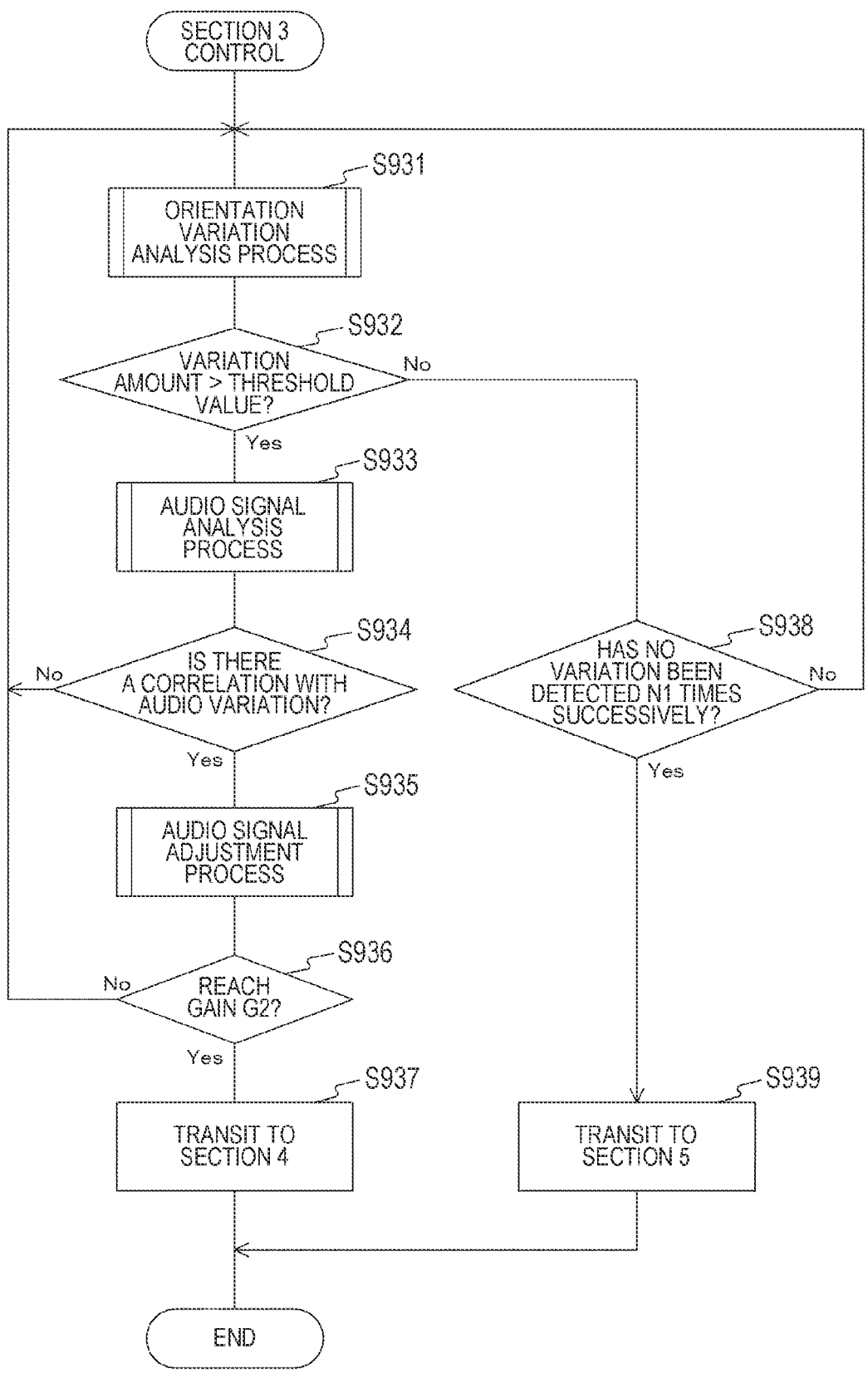
FIG. 22 is a diagram showing an example of the control processing procedure in a section 3 in the fifth embodiment of the present technology.

FIG. 22 is a diagram showing an example of the control processing procedure in a section 3 in the fifth embodiment of the present technology.

In the control in the section 3 in the present fifth embodiment, in addition to the process in the first embodiment described above, the audio signal analysis unit 140 performs the audio signal analysis process when there is an orientation variation (step S933). Then, the controller 150 determines whether or not the orientation variation correlates with the audio variation on the basis of the correlation value from the audio signal analysis unit 140 (step S934). In a case where it is determined that there is no correlation (step S934: No), as it is determined that there has been no such an orientation variation, step S931 and subsequent processes are repeated. In a case where it is determined that there is a correlation (step S934: Yes), as it is determined that the orientation variation is meaningful, the audio signal adjustment unit 160 is controlled to perform the audio signal adjustment process (step S935).

Figure 23:
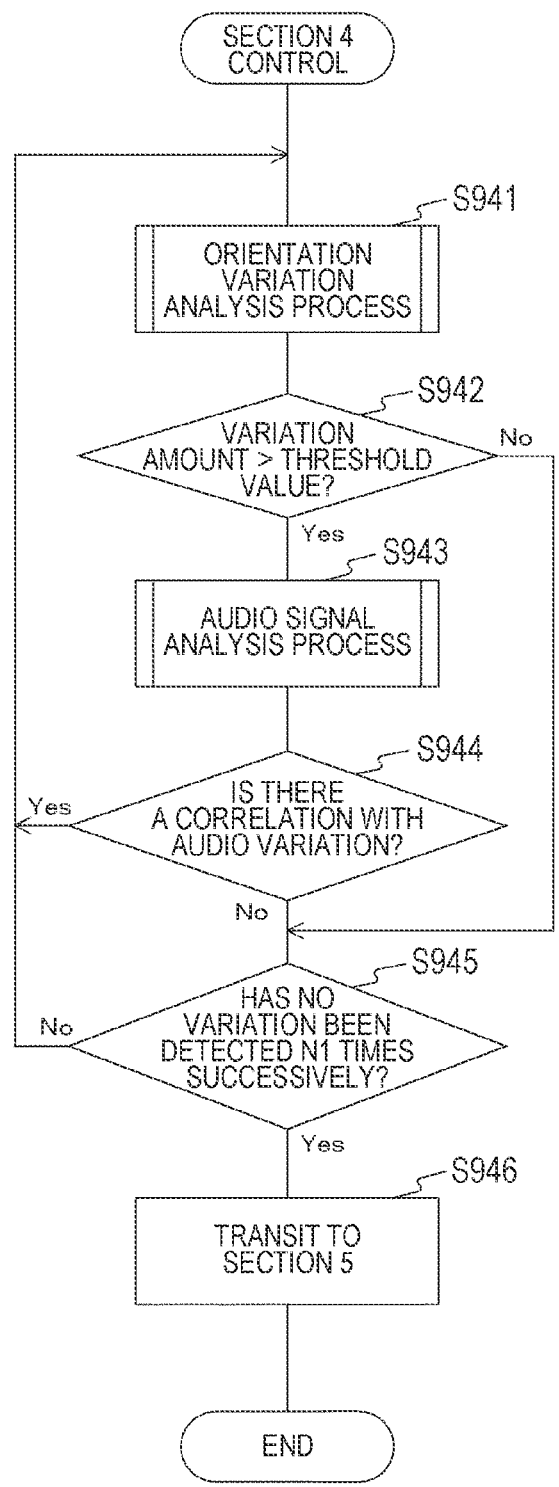
FIG. 23 is a diagram showing an example of the control processing procedure in a section 4 in the fifth embodiment of the present technology.

FIG. 23 is a diagram showing an example of the control processing procedure in a section 4 in the fifth embodiment of the present technology.

In the control in the section 4 in the present fifth embodiment, in addition to the process in the first embodiment described above, the audio signal analysis unit 140 performs the audio signal analysis process when there is an orientation variation (step S943). Then, the controller 150 determines whether or not the orientation variation correlates with the audio variation on the basis of the correlation value from the audio signal analysis unit 140 (step S944). In a case where it is determined that there is no correlation (step S944: No), as it is determined that there has been no such an orientation variation, step S945 and subsequent processes are performed. In a case where it is determined that there is a correlation (step S944: Yes), as it is determined that the orientation variation is meaningful, step S941 and subsequent processes are performed.

Figure 24:
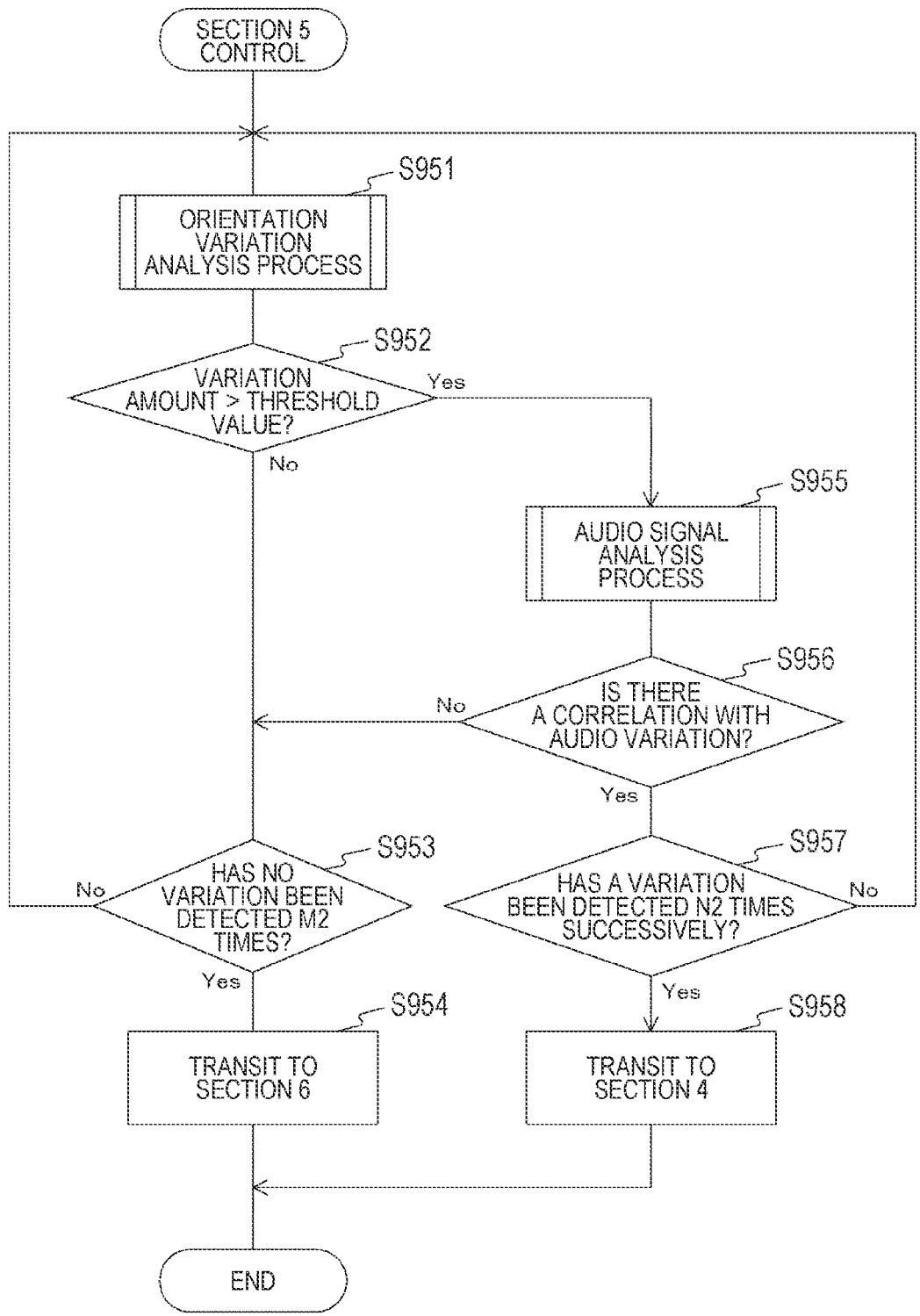
FIG. 24 is a diagram showing an example of the control processing procedure in a section 5 in the fifth embodiment of the present technology.

FIG. 24 is a diagram showing an example of the control processing procedure in a section 5 in the fifth embodiment of the present technology.

In the control in the section 5 in the present fifth embodiment, in addition to the process in the first embodiment described above, the audio signal analysis unit 140 performs the audio signal analysis process when there is an orientation variation (step S955). Then, the controller 150 determines whether or not the orientation variation correlates with the audio variation on the basis of the correlation value from the audio signal analysis unit 140 (step S956). In a case where it is determined that there is no correlation (step S956: No), as it is determined that there has been no such an orientation variation, step S953 and subsequent processes are repeated. In a case where it is determined that there is a correlation (step S956: Yes), as it is determined that the orientation variation is meaningful, step S957 and subsequent processes are performed.

Figure 25:
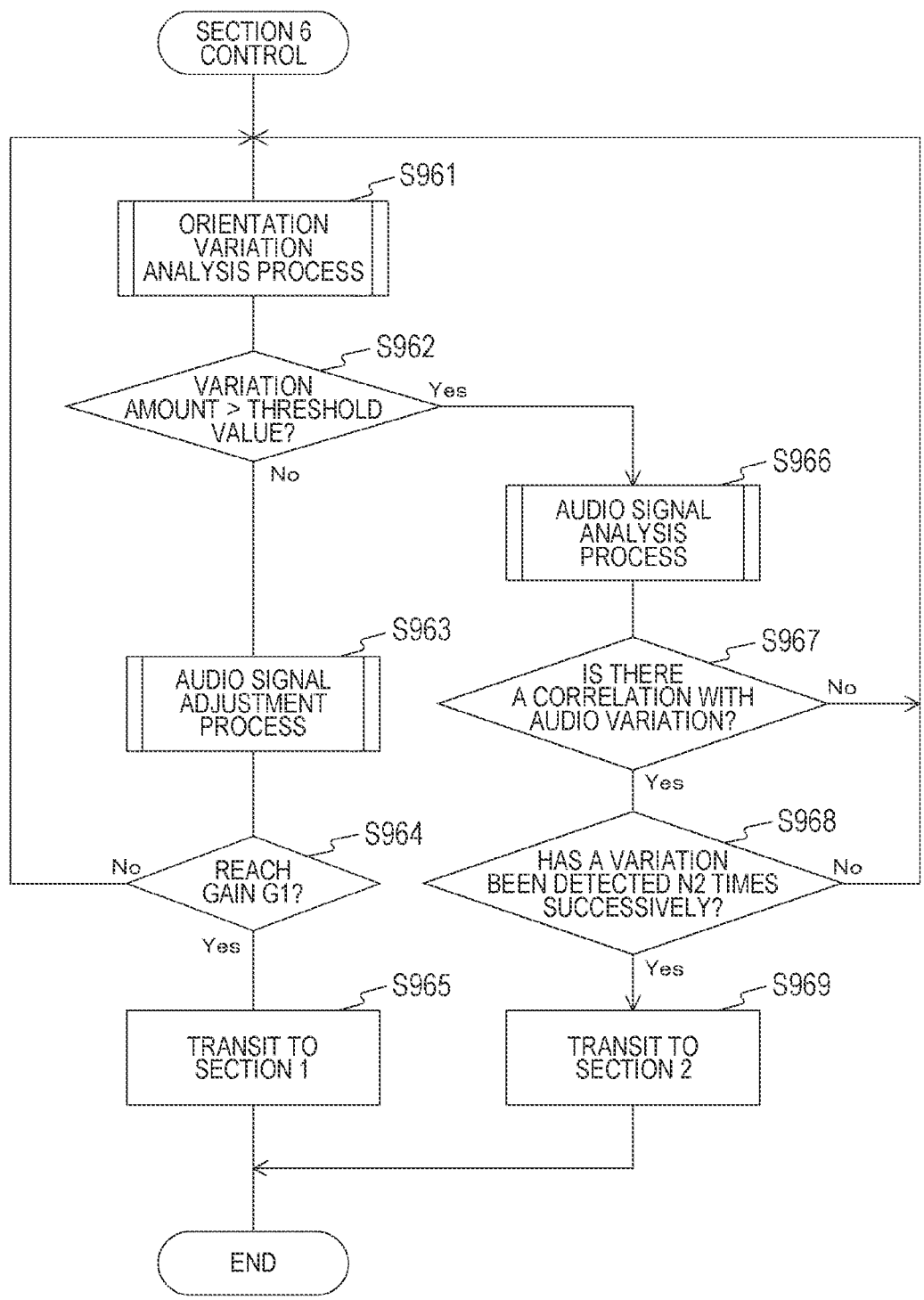
FIG. 25 is a diagram showing an example of the control processing procedure in a section 6 in the fifth embodiment of the present technology.

FIG. 25 is a diagram showing an example of the control processing procedure in a section 6 in the fifth embodiment of the present technology.

In the control in the section 6 in the present fifth embodiment, in addition to the process in the first embodiment described above, the audio signal analysis unit 140 performs the audio signal analysis process when there is an orientation variation (step S966). Then, the controller 150 determines whether or not the orientation variation correlates with the audio variation on the basis of the correlation value from the audio signal analysis unit 140 (step S967). In a case where it is determined that there is no correlation (step S967: No), as it is determined that there has been no such an orientation variation, step S961 and subsequent processes are repeated. In a case where it is determined that there is a correlation (step S967: Yes), as it is determined that the orientation variation is meaningful, step S968 and subsequent processes are performed.

In this manner, according to the fifth embodiment of the present technology, the audio signal is adjusted only in a case where the correlation between the orientation variation and the audio variation is high. Therefore, the audio signal is not adjusted in a case where there is no audio variation although there is an orientation variation.

It is to be noted that in the above-described embodiments, examples for embodying the present technology have been shown, and the matters in the embodiments and the matters specifying the invention within the scope of claims respectively have corresponding relationships. Similarly, in the matters specifying the invention within the scope of claims and the matters in the embodiments of the present technology, same names respectively have corresponding relationships. However, the present technology is not limited to the embodiments, and can be embodied by applying various modifications to the embodiments without departing from the gist thereof.

Further, the processing procedures described in the above-described embodiments may be regarded as a method having these series of procedures, and may be regarded as a program for causing a computer to carry out these series of procedures or as a recording medium for storing the program. As such a recording medium, for example, a compact disc (CD), mini disc (MD), digital versatile disc (DVD), memory card, Blu-ray disc (Blu-ray (registered trademark) Disc) and the like can be used.

It is to be noted that the effects described in the present specification are merely examples and are not limited, and other effects may be obtained.

It is to be noted that the present technology can have the following configurations.

(1) An audio signal processing device including:
    an audio signal analysis unit configured to acquire an audio signal, and configured to set a target value for an audio adjustment on the basis of the audio signal;
    an orientation variation analysis unit configured to acquire orientation information, and configured to generate an orientation variation amount on the basis of the orientation information; and an audio signal adjustment unit configured to adjust the audio signal toward the target value according to the orientation variation amount.

(2) The audio signal processing device described in the above (1),
in which the audio signal adjustment unit adjusts the audio signal to lower a volume of the audio signal when the orientation variation amount becomes larger than a first threshold value, and after the audio signal reaches the target value, when the orientation variation amount becomes smaller than a second threshold value, the audio signal adjustment unit adjusts the audio signal to return the volume of the audio signal.

(3) The audio signal processing device described in the above (1) or (2),
in which the audio signal adjustment unit adjusts the audio signal to narrow a frequency bandwidth of the audio signal when the orientation variation amount becomes larger than a first threshold value, and after the audio signal reaches the target value, when the orientation variation amount becomes smaller than a second threshold value, the audio signal adjustment unit adjusts the audio signal to return the frequency bandwidth of the audio signal.

(4) The audio signal processing device described in any of the above (1) to (3),
in which the audio signal adjustment unit adjusts the audio signal to lower a gain of a frequency of the audio signal when the orientation variation amount becomes larger than a first threshold value, and after the audio signal reaches the target value, when the orientation variation amount becomes smaller than a second threshold value, the audio signal adjustment unit adjusts the audio signal to return the gain of the frequency of the audio signal.

(5) The audio signal processing device described in any of the above (1) to (4),
in which the audio signal adjustment unit adjusts the audio signal, in a case where one of states continues for a predetermined period of time, the states including a state in which the orientation variation amount is larger than a first threshold value, and a state in which the orientation variation amount is smaller than a second threshold value.

(6) The audio signal processing device described in any of the above (1) to (5),
in which the audio signal adjustment unit adjusts the audio signal in a stepwise manner with a step size of a fixed amount.

(7) The audio signal processing device described in any of the above (1) to (6), further including a sensor configured to detect either an acceleration or an angular velocity, and configured to generate the orientation information.

(8) The audio signal processing device described in any of the above (1) to (7), further including a recording and reproducing unit configured to record and reproduce the audio signal and the orientation information in synchronization,
in which the audio signal analysis unit sets the target value on the basis of the audio signal that has been reproduced,
the orientation variation analysis unit generates an orientation variation amount on the basis of the orientation information that has been reproduced, and
the audio signal adjustment unit adjusts the audio signal that has been reproduced according to the orientation variation amount that has been reproduced.

(9) The audio signal processing device described in any of the above (1) to (8), further including
an image signal correction unit configured to acquire an image signal that is in synchronization with the audio signal, and configured to correct a blur of the image signal according to the orientation variation amount.

(10) The audio signal processing device described in any of the above (1) to (9),
in which the audio signal adjustment unit adjusts the audio signal, in a case where there is a correlation between an orientation variation indicated by the orientation variation amount and a variation in the audio signal.

REFERENCE SIGNS LIST

100 Audio signal processing device
110 Audio signal input unit
115 Audio signal recording and reproducing unit
120 Sensor signal input unit
125 Sensor signal recording and reproducing unit
130 Orientation variation analysis unit
140 Audio signal analysis unit
150 Controller
160 Audio signal adjustment unit
170 Audio signal output unit
181 Image signal input unit
182 Image signal correction unit
183 Image signal output unit

The invention claimed is:

1. An audio signal processing device, comprising:
an audio signal analysis unit configured to acquire an audio signal, and configured to set a target value for an audio adjustment based on the audio signal;
an orientation variation analysis unit configured to acquire orientation information, and configured to generate an orientation variation amount based on the orientation information; and
an audio signal adjustment unit configured to adjust the audio signal toward the target value based on the orientation variation amount,
wherein the audio signal adjustment unit is configured to adjust the audio signal to lower a volume of the audio signal based on a determination that the orientation variation amount becomes larger than a first threshold value, and
based on a determination that the audio signal reaches the target value, and the orientation variation amount becomes smaller than a second threshold value, the audio signal adjustment unit is configured to adjust the audio signal to return the volume of the audio signal.

2. The audio signal processing device according to claim 1,
wherein the audio signal adjustment unit is configured to adjust the audio signal to narrow a frequency bandwidth of the audio signal based on a determination that the orientation variation amount becomes larger than a first threshold value, and
based on the determination that the audio signal reaches the target value, and the orientation variation amount becomes smaller than a second threshold value, the audio signal adjustment unit is configured to adjust the audio signal to return the frequency bandwidth of the audio signal.

3. The audio signal processing device according to claim 1,
wherein the audio signal adjustment unit is configured to adjust the audio signal to lower a gain of a frequency of the audio signal based on the determination that the orientation variation amount becomes larger than the first threshold value, and
based on the determination that the audio signal reaches the target value, and the orientation variation amount becomes smaller than the second threshold value, the audio signal adjustment unit is configured to adjust the audio signal to return the gain of the frequency of the audio signal.

4. The audio signal processing device according to claim 1,
wherein the audio signal adjustment unit is configured to adjust the audio signal, in a case where one of states continues for a predetermined period of time, the states including a first state in which the orientation variation amount is larger than the first threshold value, and a second state in which the orientation variation amount is smaller than the second threshold value.

5. The audio signal processing device according to claim 1,
wherein the audio signal adjustment unit is configured to adjust the audio signal in a stepwise manner with a step size of a fixed amount.

6. The audio signal processing device according to claim 1, further comprising a sensor configured to detect either an acceleration or an angular velocity, and configured to generate the orientation information.

7. The audio signal processing device according to claim 1, further comprising a recording and reproducing unit configured to record and reproduce the audio signal and the orientation information in synchronization,
wherein the audio signal analysis unit is configured to set the target value based on the audio signal that has been reproduced,
the orientation variation analysis unit is configured to generate the orientation variation amount based on the orientation information that has been reproduced, and
the audio signal adjustment unit is configured to adjust the audio signal that has been reproduced according to the orientation variation amount that has been reproduced.

8. An audio signal processing device, comprising:
an audio signal analysis unit configured to acquire an audio signal, and configured to set a target value for an audio adjustment based on the audio signal;
an orientation variation analysis unit configured to acquire orientation information, and configured to generate an orientation variation amount based on the orientation information;
an audio signal adjustment unit configured to adjust the audio signal toward the target value based on the orientation variation amount; and
an image signal correction unit configured to acquire an image signal that is in synchronization with the audio signal, and configured to correct a blur of the image signal based on the orientation variation amount.

9. The audio signal processing device according to claim 1,
wherein the audio signal adjustment unit is configured to adjust the audio signal, based on a correlation between an orientation variation indicated by the orientation variation amount and a variation in the audio signal.

\* \* \* \* \*